(12) United States Patent
Tanaka

(10) Patent No.: US 8,483,747 B2
(45) Date of Patent: Jul. 9, 2013

(54) BASE STATION, COMMUNICATION METHOD, AND MOBILE STATION

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/454,937

(22) Filed: Apr. 24, 2012

(65) Prior Publication Data
US 2012/0208599 A1 Aug. 16, 2012

Related U.S. Application Data

(63) Continuation of application No. PCT/JP2009/068665, filed on Oct. 30, 2009.

(51) Int. Cl.
*H04B 7/00* (2006.01)
(52) U.S. Cl.
USPC ............ 455/525; 455/522; 455/69; 370/318; 370/331; 370/332
(58) Field of Classification Search
USPC .............. 455/525, 522, 69, 436–444, 425.1, 455/426.2; 370/331, 332, 318, 311
See application file for complete search history.

(56) References Cited

U.S. PATENT DOCUMENTS

| | | | |
|---|---|---|---|
| 5,832,368 A * | 11/1998 | Nakano et al. | 455/63.1 |
| 6,658,045 B1 * | 12/2003 | Jin | 375/147 |
| 2004/0157608 A1 * | 8/2004 | Kurose et al. | 455/436 |
| 2007/0066339 A1 * | 3/2007 | Usuda et al. | 455/522 |
| 2007/0086380 A1 * | 4/2007 | Lim et al. | 370/329 |
| 2007/0213056 A1 * | 9/2007 | Im et al. | 455/436 |
| 2008/0268893 A1 * | 10/2008 | Lee et al. | 455/522 |
| 2008/0309554 A1 * | 12/2008 | Venkatesan | 342/367 |
| 2010/0159972 A1 * | 6/2010 | Cho et al. | 455/501 |
| 2010/0273492 A1 * | 10/2010 | Liu et al. | 455/446 |

FOREIGN PATENT DOCUMENTS

JP  2008-104184  5/2008

OTHER PUBLICATIONS

3GPP TR 36.912 V9.0.0; 3rd Generation Partnership Project; Technical Specification Group Radio Access Network; "Feasibility study for Further Advancements for E-UTRA (LTE Advanced), (Release 9)"; Sep. 2009.
3GPP TS 36.423 V9.0.0; 3rd Generation Partnership Project; Technical Specification Group Radio Access Network; "Evolved Universal Terrestrial Radio Access Network (E-UTRAN); X2 application protocol (X2AP)", (Release 9); Sep. 2009.
CATT; "Proposal of multiple sites coordination for LTE-A TDD"; Agenda Item 11.4; 3GPP TSG RAN WG1, meeting #55; R1-084290; Prague, Czech Republic; Nov. 10-14, 2008.
Nortel; "Cell Clustering fo CoMP Transmission/Reception"; Agenda Item 11.4; 3GPP TSG-RAN Working Group 1, Meeting #55; Prague, Czech Republic; Nov. 10-14, 2008.

(Continued)

*Primary Examiner* — Kamran Afshar
*Assistant Examiner* — Marisol Fahnert
(74) *Attorney, Agent, or Firm* — Myers Wolin, LLC

(57) ABSTRACT

A base station requests cooperative transmission of a base station forming a nearby cell that is near a mobile station. The base station further includes an acquirer that acquires a reception power for each nearby cell of the mobile station; a calculator that calculates a value for each acquired reception power, weighted by a coefficient of the nearby cell; and a selector that based on each value calculated by the calculator and from among the nearby cells, selects a cell of which the cooperative transmission is to be requested.

17 Claims, 22 Drawing Sheets

OTHER PUBLICATIONS

International Search Report issued for corresponding International Patent Application No. PCT/JP2009/068665 mailed Jan. 19, 2010.

The extended European search report includes supplementary European search report and European search opinion, issued for corresponding European Patent Application No. 09850846.8 dated Aug. 10, 2012.

Tokyo Institute of Technology, KDDI; "Distributed Dynamic CoMP for LTE-Advanced (Revision from R1-093608)"; Agenda Item: 7.5 (CoMP); R1-094285; 3GPP TSG RAN WG1 Meeting #58B; Miyazaki, Japan; Oct. 12-16, 2009.

NEC Group; "Potential gain of DL CoMP with joint transmission"; Agenda Item 15.2; R1-091688; 3GPP TSG RAN WG1 Meeting #57; San Francisco, USA; May 4-8, 2009.

3GPP TR 36.814 V1.1.1 (Jun. 2009); 3rd Generation Partnership Project; Technical Specification Group Radio Access Network; "Further Advancements for E-UTRA Physical Layer Aspects (Release 9)"; Jun. 2009.

3GPP TS 36.214 V8.7.0 (Sep. 2009); 3rd Generation Partnership Project; Technical Specification Group Radio Access Network; Evolved Universal Terrestrial Radio Access (E-UTRA); "Physical layer—Measurements (Release 8)"; Sep. 2009.

Alcatel-Lucent Shanghai Bell, Alcatel-Lucent; "Uplink coordinated multi-point reception with distributed inter-cell interference suppression for LTE-A"; Agenda Item: 15.2; R1-093366; 3GPP TSG RAN WG1 Meeting #58; Shenzhen, China; Aug. 24-28, 2009.

The extended European search report includes European search opinion, issued for corresponding European Patent Application No. 12170276.5 dated Aug. 10, 2012.

\* cited by examiner

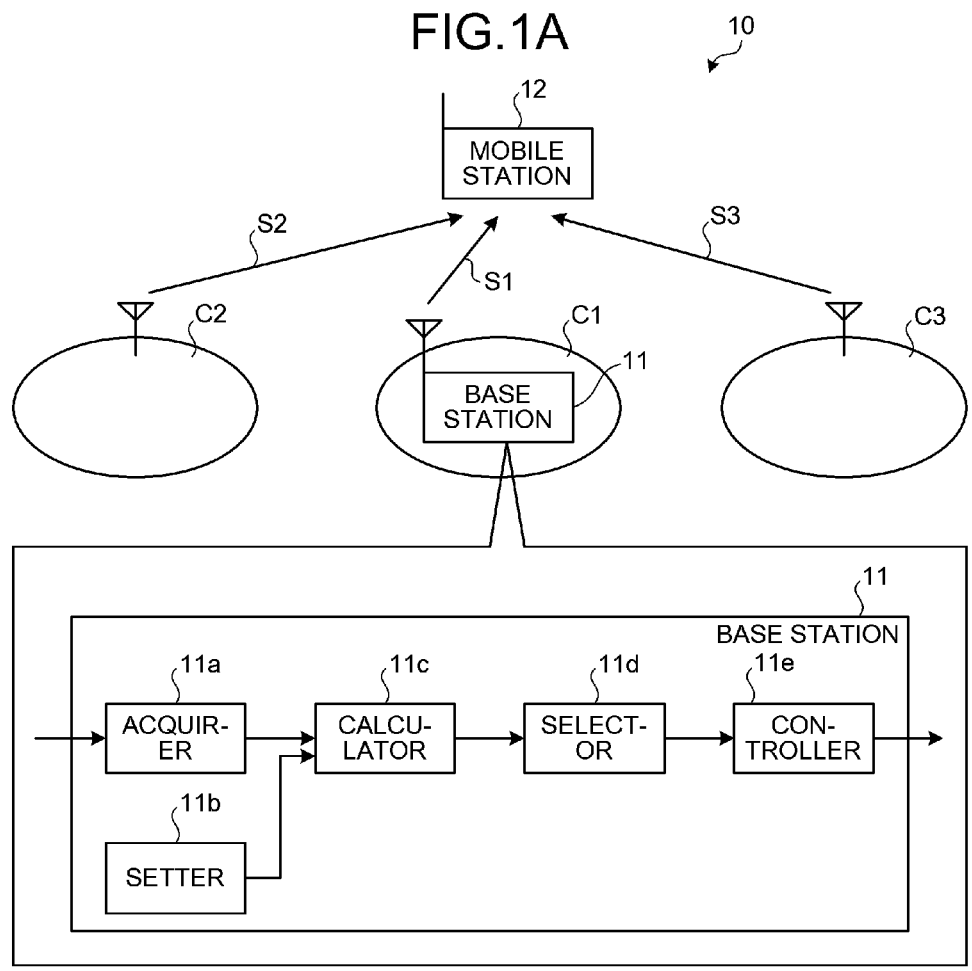

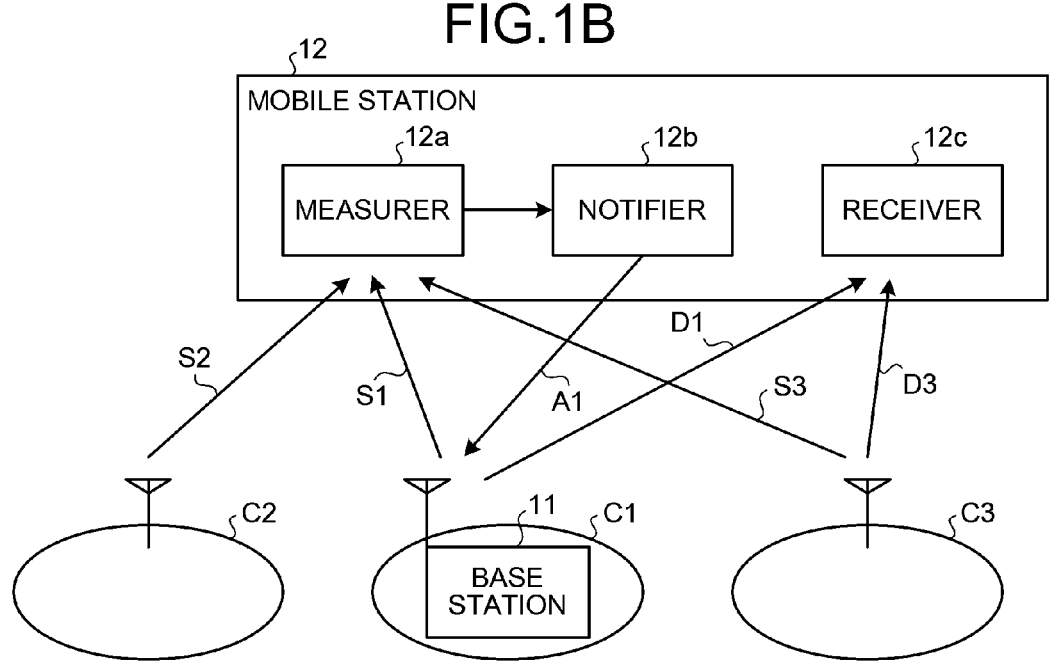

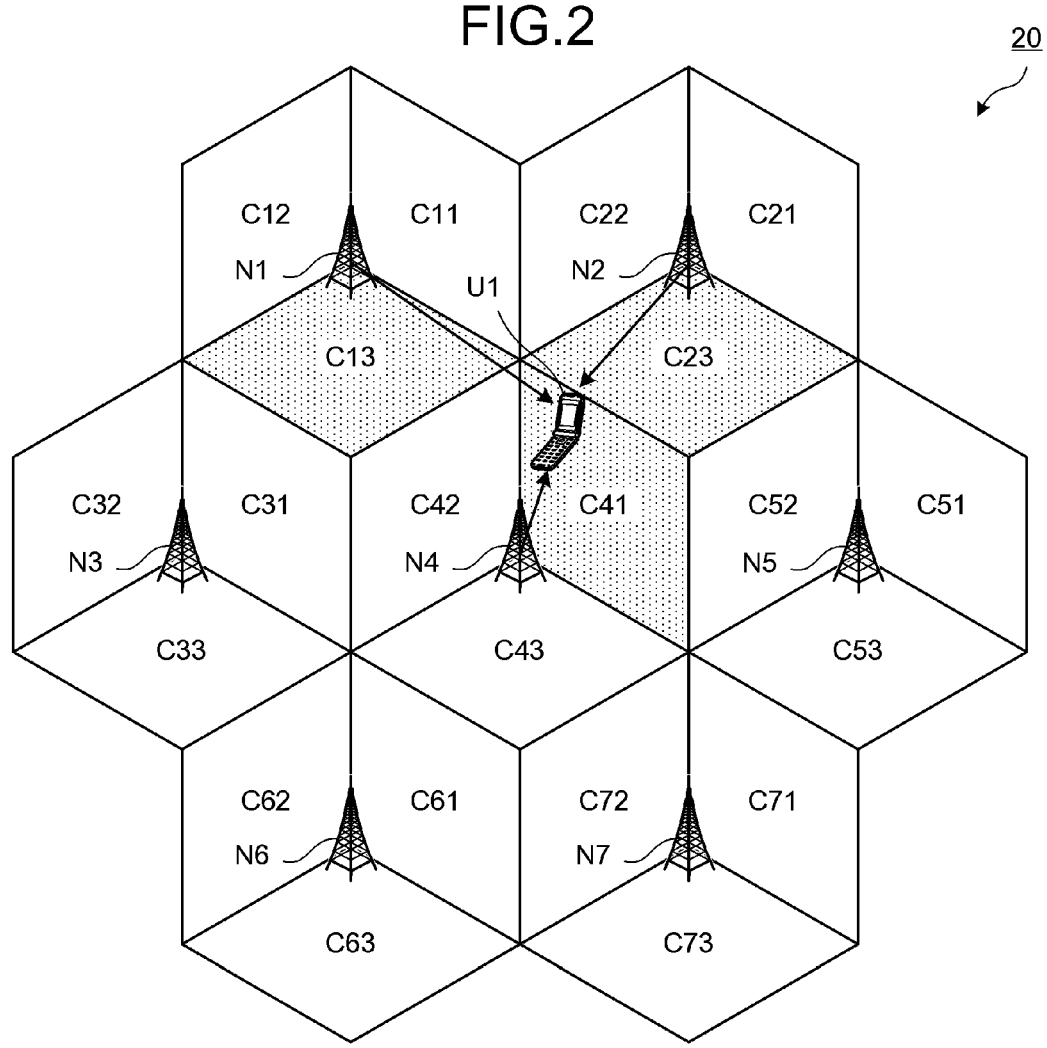

FIG.11

| k | $x_k$ | $f_k$ |
|---|---|---|
| 1 | INTERCELLULAR COMMUNICATION DELAY | FUNCTION THAT DECREASES AS DELAY INCREASES |
| 2 | TRAVELING SPEED OF MOBILE STATION | FUNCTION THAT DECREASES AS TRAVELING SPEED INCREASES |
| 3 | COOPERATIVE COMMUNICATION SCHEME | f(JT) >f (CB/CS) |
| 4 | TRANSMISSION ANTENNA COUNT | FUNCTION THAT DECREASES AS ANTENNA COUNT DECREASES |
| 5 | NUMBER OF USERS FOR WHICH COMMUNICATION IS MULTIPLEXED | FUNCTION THAT DECREASES AS NUMBER OF USERS INCREASES |

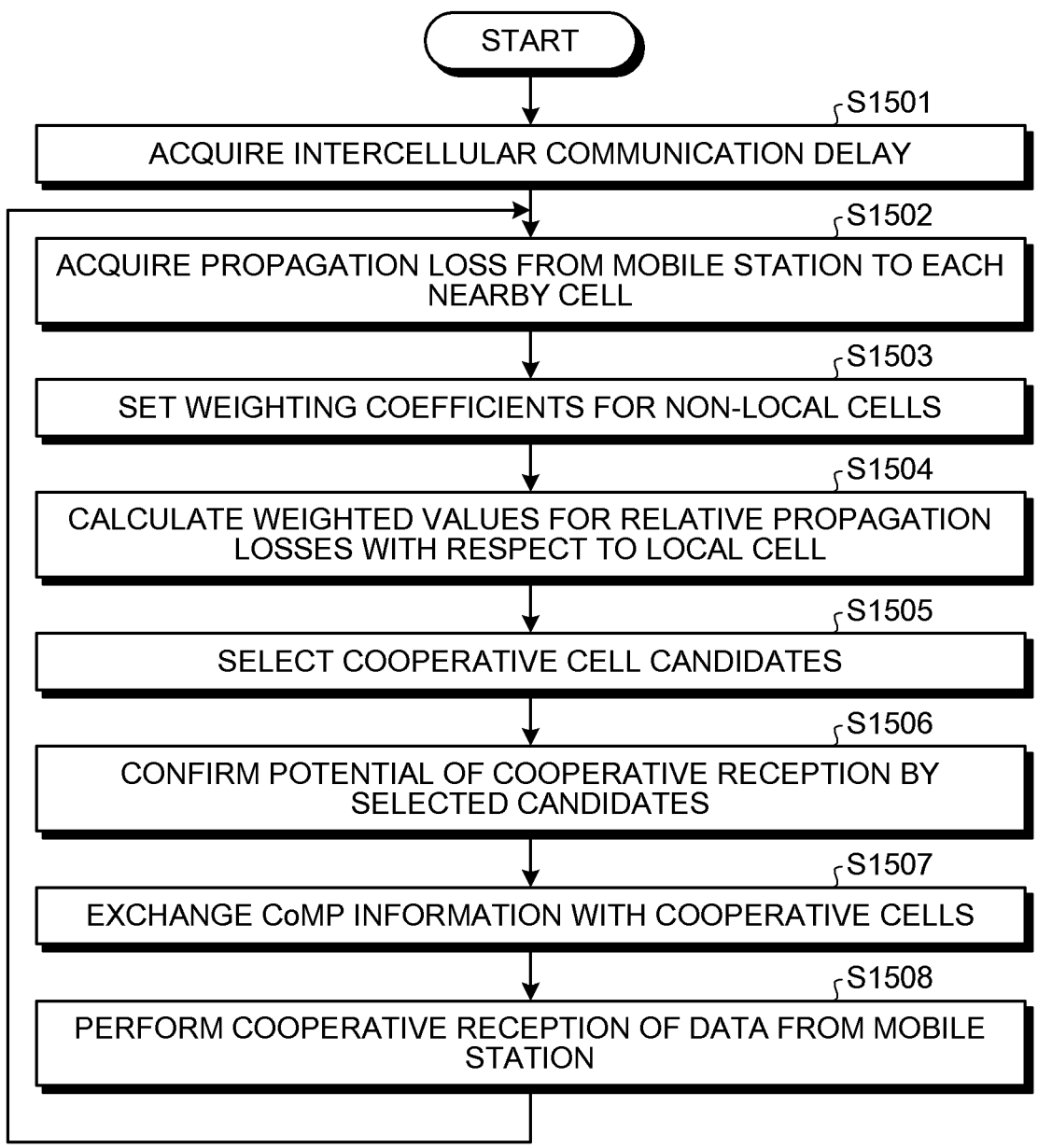

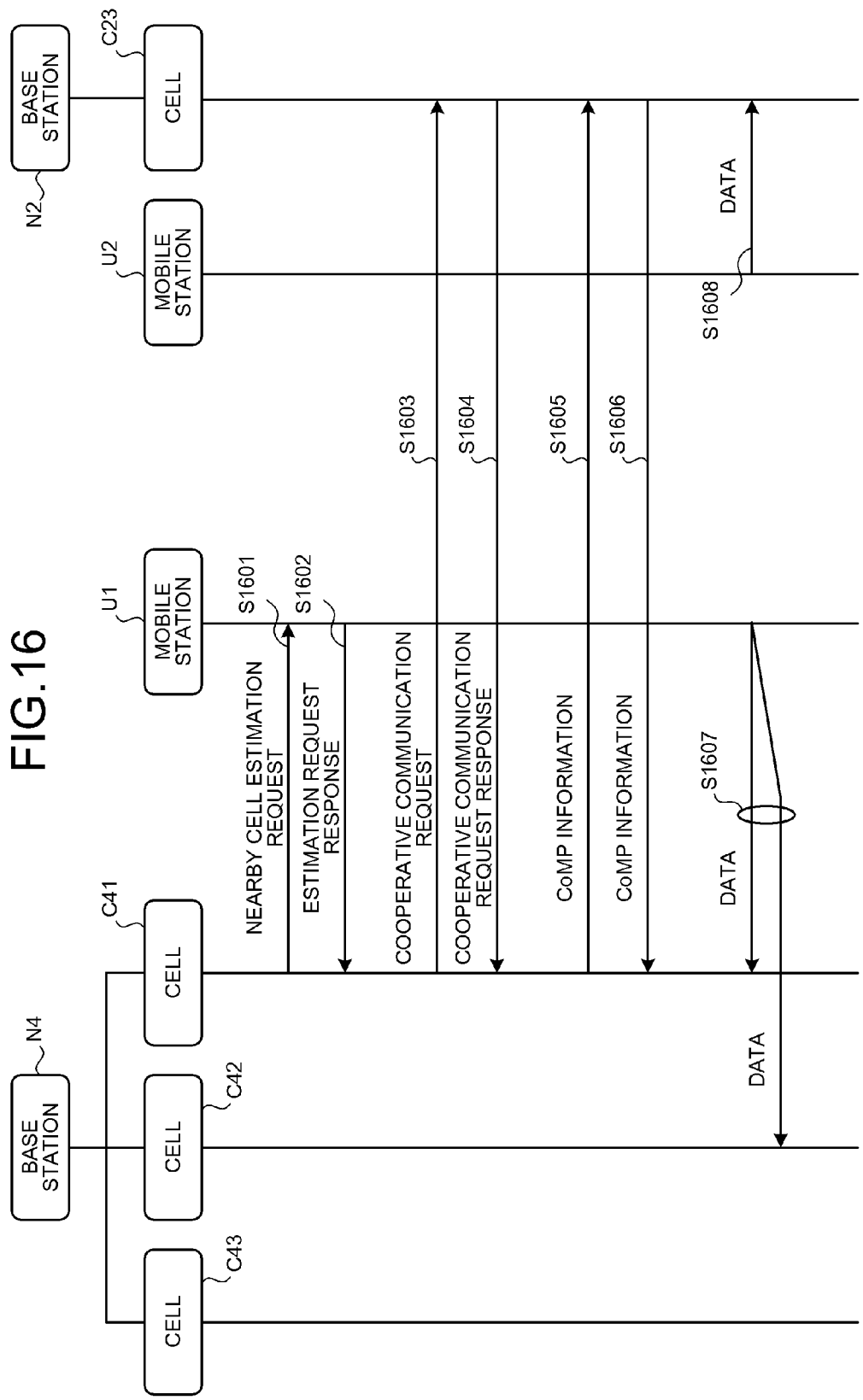

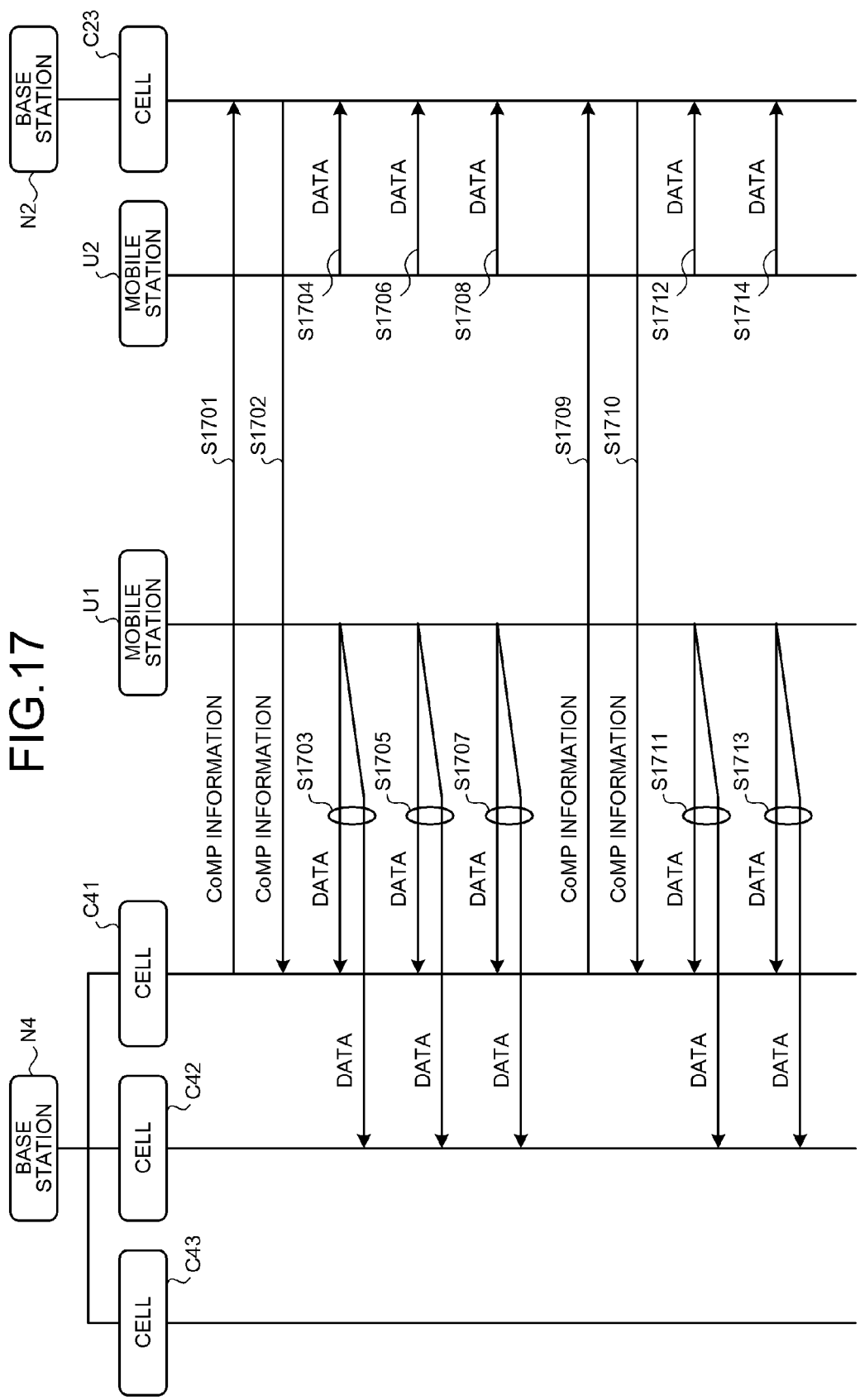

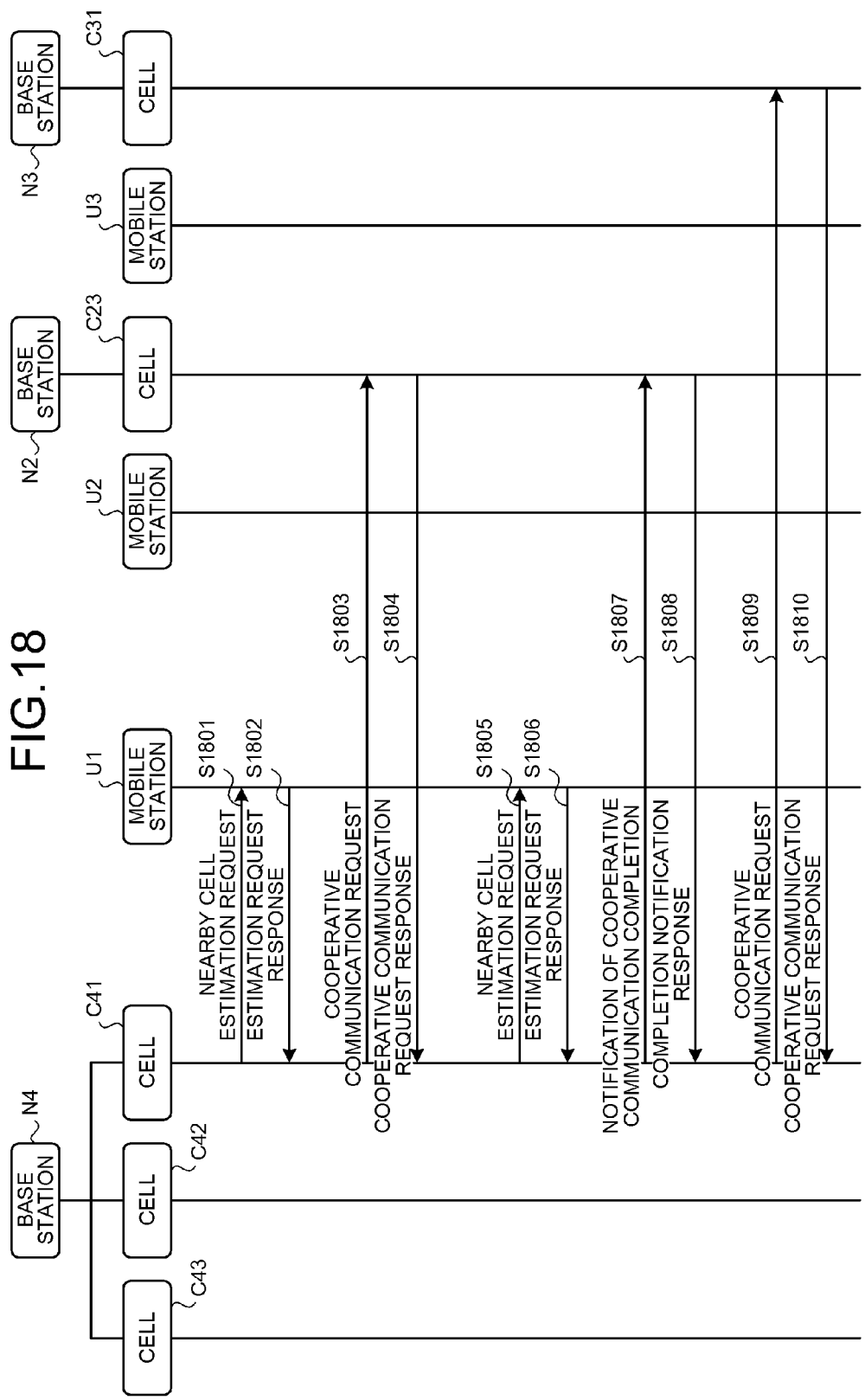

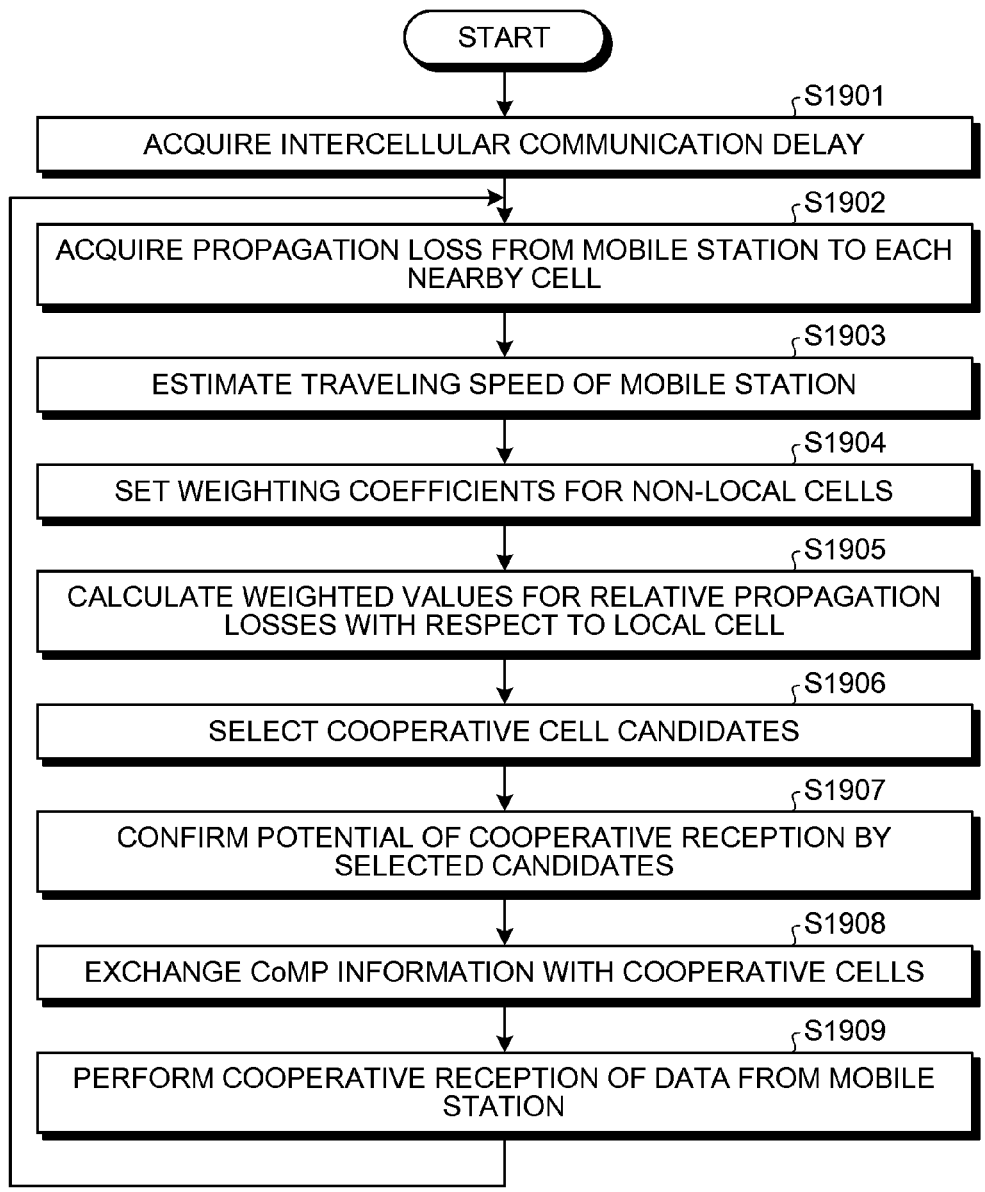

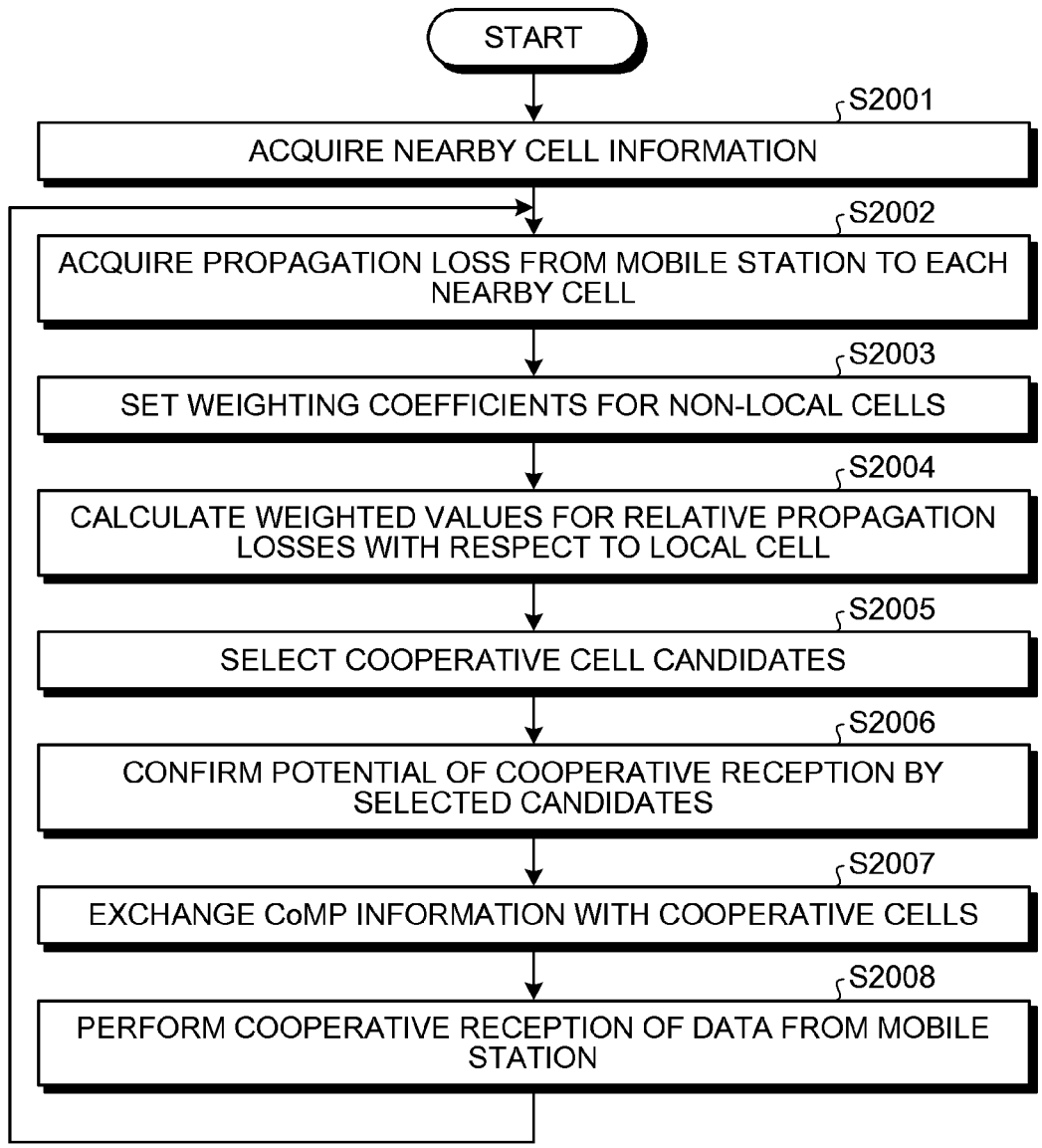

BASE STATION, COMMUNICATION METHOD, AND MOBILE STATION

CROSS REFERENCE TO THE RELATED APPLICATIONS

This application is a continuation application of International Application PCT/JP2009/068665, filed Oct. 30, 2009, the entire contents of which are incorporated herein by reference.

FIELD

The embodiments discussed herein is are related to a base station, a communication method, and a mobile station that perform wireless communication.

BACKGROUND

In mobile communication systems such as for mobile telephones, a cellular scheme is used in which communication is continued over a wide area of combined areas (cells) in which a base station can transmit and receive, as base stations are switched according to the movement of a mobile station. Currently, for example, third generation mobile communication services by code division multiple access (CDMA) are provided. Meanwhile, next generation mobile communication schemes offering faster communication are under investigation.

For example, under the 3rd Generation Partnership Project (3GPP), Long Term Evolution (LTE) and LTE-advanced are under investigation (see, for example, "3GPP TR 36.912 V9.0.0", September 2009, retrieved from Internet: Oct. 21, 2009 <URL:http://www.3gpp.org/ftp/Specs/archive/36_series/36.423/3 6423-900.zip>). Under LTE-advanced, as a method of improving throughput and coverage (throughput for users at cell edges), the introduction of cooperative communication technology via multiple cells is under investigation. For downlink cooperative communication, cooperative downlink transmission is performed from multiple cells with respect to a given mobile station. For uplink cooperative communication, cooperative uplink communication from multiple cells is performed with respect to the given mobile station.

Under LTE-advanced, joint transmission (JT), fast cell selection (FS), coordinated beam forming (CB), and coordinated scheduling (CS), for example, are under investigation as methods of cooperative downlink transmission.

Further, in an LTE system, base stations communicate with one another to perform handover and control interference. The line for this communication is prescribed as an X2 interface (see, for example, "3GPP TS 36.423 V9.0.0", September 2009, retrieved from Internet: Oct. 21, 2009 <URL:http://www.3gpp.org/ftp/Specs/archive/36_series/36.912/3 6912-900.zip>). Similar to LTE, under LTE-advanced as well, an interface such as an X2 interface is conceivable.

In cooperative communication, when there are numerous cooperative cells, measurement processing at the mobile station and the amount of information for providing notification of measurement results, from the mobile station to the base station, increase. The amount of control information exchanged among the base stations also increases. Thus, a small number of cells are preliminarily selected as candidate cells. For example, a technique that uses the strength of reference signals received from nearby cells is used as a method of selecting candidate cells. Cells for which the received reference signal strength is strong are selected as candidate cells and when no candidate cell is selected, a cell that is a large source of interference is selected as a candidate cell and the interference is reduced.

Nonetheless, the effectiveness of interference reduction by cooperative communication varies according to factors other than the strength of reception at a cooperative cell. Consequently, in technologies that select cooperative cells based on the strength of reception, interference cannot be sufficiently reduced, arising in a problem that communication quality cannot be improved.

SUMMARY

According to an aspect of an embodiment, a base station requests cooperative transmission of a base station forming a nearby cell that is near a mobile station. The base station further includes an acquirer that acquires a reception power for each nearby cell of the mobile station; a calculator that calculates a value for each acquired reception power, weighted by a coefficient of the nearby cell; and a selector that based on each value calculated by the calculator and from among the nearby cells, selects a cell of which the cooperative transmission is to be requested.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a block diagram of a communication system according to a first embodiment.

FIG. 1B is a block diagram of a mobile station according to the first embodiment.

FIG. 2 is a diagram of a first example of cooperative transmission for downlink communication.

FIG. 15 is a flowchart of a first example of uplink operations of the base station.

FIG. 16 is a sequence diagram of one example of processes for cooperative reception for uplink communication.

FIG. 17 is a sequence diagram of one example of periodic exchange of control information for uplink communication.

FIG. 18 is a sequence diagram of one example of periodic cooperative cell updating for uplink communication.

FIG. 19 is a flowchart of a second example of uplink operations of the base station.

FIG. 20 is a flowchart of a third example of uplink operations of the base station.

DESCRIPTION OF EMBODIMENTS

Figure 3:
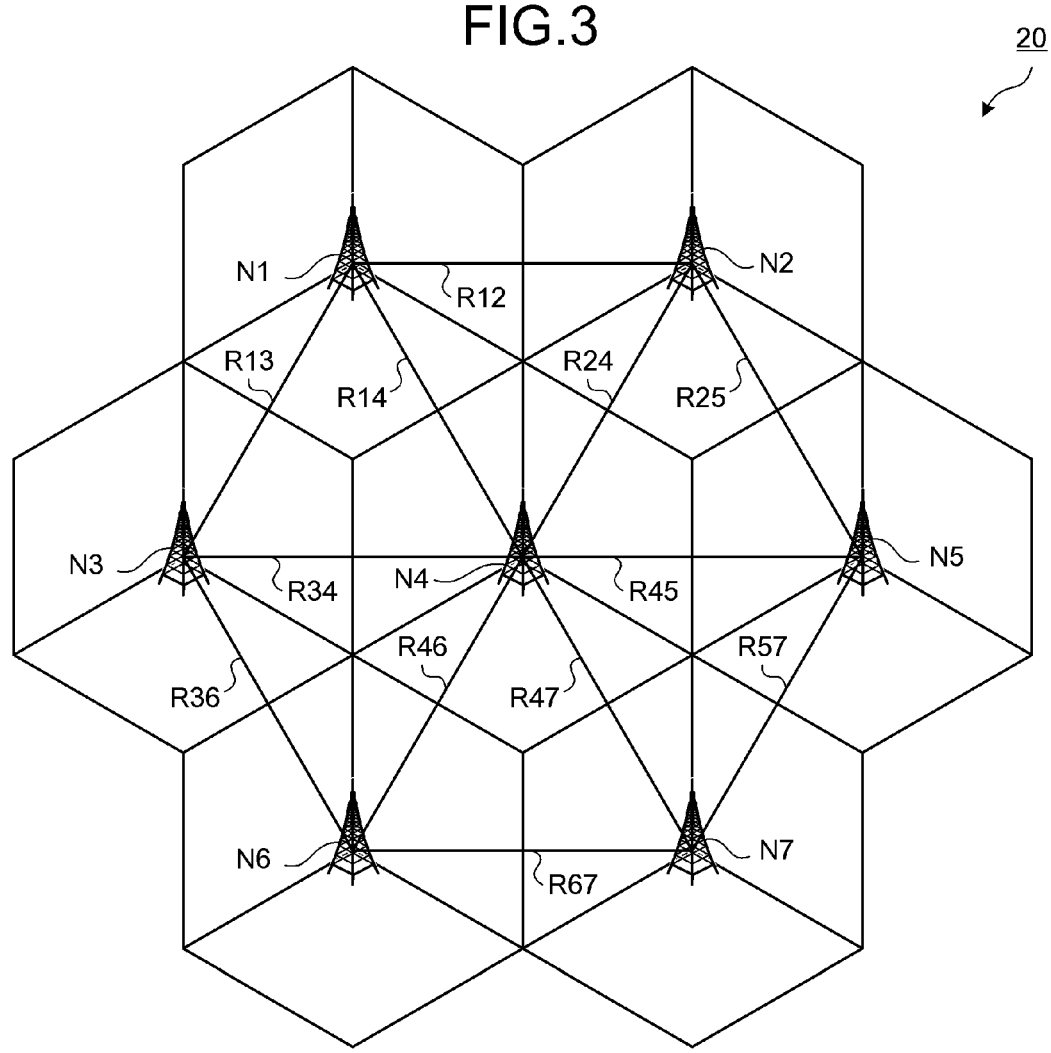
FIG. 3 is a diagram of an example of a network between base stations.

Preferred embodiments of the present invention will be explained with reference to the accompanying drawings. Based on cellular reception powers that have been weighted by coefficients set for each cell, the base station, communication method, and mobile station select cooperative cells to perform cooperative communication, whereby a cell having large reduction effect on interference is preferentially selected as a cooperative cell, thereby improving communication quality.

In a first embodiment, cooperative transmission for downlink communication will be described.

FIG. 1A is a block diagram of a communication system according to a first embodiment. A communication system 10 depicted in FIG. 1A is a communication system that includes cells C1 to C3 and that with respect to the mobile station 12, performs cooperative transmission via cooperative cells. A base station 11 is a base station in the communication system 10. The cell C1 is the local cell of the mobile station 12. Further, the cell C1 is a cell managed by the base station 11. The cells C2, C3 may be cells managed by the base station 11 or cells managed by a base station other than the base station 11.

The base station 11 uses the cell C1 to wirelessly communicate with the mobile station 12. The base station 11 further requests base stations forming nearby cells (e.g., cells C2, C3) of the mobile station 12, for cooperative transmission. For example, the base station 11 includes an acquirer 11a, a setter 11b, a calculator 11c, a selector 11d, and a controller 11e.

The acquirer 11a acquires the reception power of reference signals that are transmitted from nearby cells of the mobile station 12 to the mobile station 12. For example, the acquirer 11a acquires the reception power of the local cell (cell C1) of the mobile station 12 and the reception powers for non-local cells (cells C2, C3) that are different from the local cell of the mobile station 12.

For example, the acquirer 11a transmits to the mobile station 12, a nearby-cell measurement request requesting measurement of the strength of reception from nearby cells. The mobile station 12, in response to the nearby-cell measurement request from the acquirer 11a, measures the reception power of reference signals S1 to S3 from the cells C1 to C3 and transmits the measurement results to the base station 11. The acquirer 11a acquires the measurement results transmitted from the mobile station 12. The acquirer 11a notifies the calculator 11c of the acquired reception powers.

The setter 11b sets weighting coefficients for the non-local cells (cells C2, C3). For example, among the non-local cells, the setter 11b sets a relatively large coefficient for a cell having a large reduction effect on interference that is consequent to participation in cooperative transmission and sets a relatively small coefficient for a cell having a small reduction effect on the interference. Coefficient setting by the setter 11b will be described in detail hereinafter. The setter 11b notifies the calculator 11c of the set coefficients.

The calculator 11c calculates a value for each reception power notified by the acquirer 11a, the values being weighted by the coefficients notified by the setter 11b. For example, the calculator 11c calculates a ratio of the reception power of each non-local cell with respect to the reception power of the local cell, weighted by the corresponding coefficient. In other words, the calculator 11c calculates a reception power ratio for the cell C1 and the cell C2, weighted by the coefficient for the cell C2; and a reception power ratio for the cell C1 and the cell C3, weighted by the coefficient for the cell C3. The calculator 11c notifies the selector 11d of the calculated values.

The selector 11d, from among the non-local cells (cells C2, C3) of the mobile station 12 and based on the values notified by the calculator 11c, selects a cooperative cell. For example, the selector 11d compares each value with a threshold and based on the comparison result, selects a cooperative cell. The selector 11d, for example, from among the cells C2, C3, selects as the cooperative cell, the cell for which the value notified by the calculator 11c is greater than or equal to the threshold. The selector 11d notifies the controller 11e of the selected cooperative cell.

The controller 11e uses the cooperative cell selected by the selector 11d to perform cooperative transmission with respect to the mobile station 12. For example, if the cell C2 is selected as the cooperative cell by the selector 11d, the controller 11e uses the cell C1, which is the local cell of the mobile station 12, and the cell C2, which has been selected as a cooperative cell, to perform cooperative transmission with respect to the mobile station 12.

For example, if the cell C2 is managed by the base station 11, the controller 11e controls the cell C1 and the cell C2 to cooperate and transmit data. Further, if the cell C2 is a cell managed by a base station different from the base station 11, the controller 11e transmits to the base station managing the cell C2, a cooperative communication request requesting cooperation with data communication by the cell C1 and the transmission of data.

For example, if the communication system 10 is applied to LTE-advanced, JT, FS, CB, or CS can be used as a downlink cooperative communication scheme. Under JT, the same data from multiple cells is transmitted to the mobile station 12 simultaneously, using the same wireless resource. Since a combined signal from multiple cells is received at the mobile station 12, the reception signal to interference and noise ratio (SINR) is improved by synthesized gain, diversity gain, etc.

Under FS, although one cell simultaneously transmits data to the mobile station 12, the transmitting the cell changes according to the wireless propagation state. Under CB and CS, the same wireless resource is used for transmissions to different mobile stations in a cooperative cell and scheduling and pre-coding control are cooperatively controlled. Since mutual interference can be reduced by cooperative control, communication quality can be improved. Under CB, between cooperative cells, pre-coding is primarily controlled cooperatively. Under CS, between cooperative cells, scheduling is primarily controlled cooperatively.

The acquirer 11a, for example, can be implemented by a wireless communication interface that performs wireless communication with the mobile station 12. The setter 11b, the calculator 11c, and the selector 11d, for example, can be implemented by a computing circuit such as a central processing unit (CPU). The controller 11e, for example, can be implemented by a wireless communication interface that performs wireless communication with the mobile station 12 or a computing circuit such as a CPU.

FIG. 1B is a block diagram of the mobile station according to the first embodiment. In FIG. 1B, components identical to those depicted in FIG. 1A are given the same reference numerals used in FIG. 1A and description thereof is omitted. As depicted in FIG. 1B, the mobile station 12 according to the first embodiment includes a measurer 12a, a notifier 12b, and a receiver 12c.

The measurer 12a measures the reception power of signals that are transmitted from cells (cells C1 to C3) near the mobile station 12 to the mobile station 12. The measurer 12a outputs the measured reception powers to the notifier 12b. The notifier 12b notifies the base station 11 of the reception powers output from the measurer 12a (reference numeral A1). For example, when a nearby-cell measurement request is transmitted from the base station 11, the measurer 12a measures the reception power of signals from nearby cells and the notifier 12b transmits the measurement results to the base station 11.

Consequently, the base station 11 can calculate values for the reception powers of the nearby cells of the mobile station 12, weighted by the coefficients set for the nearby cells of the mobile station 12 and based on the calculated values, can select cooperative cells. The receiver 12c of the mobile station 12 uses the cooperative cells selected by the base station 11 to receive data that is cooperatively transmitted.

Thus, based on the values for the reception powers from nearby cells of the mobile station 12, weighted by the nearby-cell-specific coefficients, the receiver 12c can receive data cooperatively transmitted from a portion of or all of the cells selected from among the nearby cells. For example, the receiver 12c receives data D1, D3 cooperatively transmitted by the cell C1 and the cell C3.

FIG. 2 is a diagram of a first example of cooperative transmission for downlink communication. A communication system 20 includes base stations N1 to N7. The base station N1 manages the cells C11 to C13. Similarly, the base stations N2 to N7, respectively, manage the cells C21 to C23, the cells C31 to C33, the cells C41 to C43, the cells C51 to C53, the cells C61 to C63, and the cells C71 to C73.

In this example, a mobile station U1 is located in the cell C41. In this case, the cell C41 is the local cell of the mobile station U1 (cell in which the mobile station U1 is registered). Further, in the communication system 20, cooperative transmission with the mobile station U1 is performed using the cell C41, which is the local cell of the mobile station U1, and other cells such as the cell C13, the cell C23, etc.

FIG. 3 is a diagram of an example of a network between base stations. As depicted in FIG. 3, the base station N1 to N7, for example, are respectively connected by paths R12 to R14, R24, R25, R34, R36, R45 to R47, R57, and R67. For example, the base station N4 is connected to the base station N1 by the path R14. The base station N4 is further connected to the base station N2 by the path R24. The paths R12 to R14, R24, R25, R34, R36, R45 to R47, R57, and R67 are, for example, wired communication paths and implemented by, for example, an X2 interface.

Selection of cooperative cells by the base station N4 will be described. Here, excluding the local cell (cell C41) of the mobile station U1, the cells are assumed as non-local cells i (i=1, 2, 3, . . . ). The calculator 11c of the base station N4, for example, calculates the left-hand side term of expression 1 below. The selector 11d of the base station N4 selects from among the non-local cells i of the mobile station U1 and as a cooperative cell, for example, a non-local cell i that satisfies expression 1.

$$\frac{w_i P_i}{P_0} \geq \gamma \quad (1)$$

In equation (1), reception power $P_0$ is the reception power of the reference signal from the local cell (cell C41), measured by the mobile station U1. Reception power $P_i$ is the reception power of the reference signal from the non-local cell i, measured by the mobile station U1. Coefficient $w_i$ is a weighting coefficient of the non-local cell i, set by the setter 11b of the base station N4. $\gamma$ is a threshold.

In this manner, the calculator 11c of the base station N4 calculates a value for each ratio of the reception power $P_i$ of the non-local cell i to the reception power $P_0$ of the local cell, weighted by the coefficient $w_i$. The selector 11d of the base station N4 compares the threshold $\gamma$ and the values calculated by the calculator 11c, and selects as a cooperative cell, a non-local cell i for which the value calculated by the calculator 11c is greater than or equal to the threshold $\gamma$. Thus, from among the non-local cells i, a cell having a large reduction effect on interference that is consequent to participation in cooperative transmission can be preferentially selected.

The setting of weighting coefficients based on communication delay between cells will be described. The setter 11b of the base station N4 sets the coefficient $w_i$ in expression 1 by, for example, equation 2 below. In equation (2), delay $\tau_i$ is the amount of intercellular delay between the local cell (the cell C41) and the non-local cells i of the mobile station U1. $\tau_{TH}$ is a threshold of the delay $\tau_i$.

$$w_i = \begin{cases} \alpha & (\text{if } \tau_i < \tau_{TH}) \\ \beta & (\text{if } \tau_i \geq \tau_{TH}) \end{cases} \quad (\alpha > \beta) \quad (2)$$

Thus, the coefficient $w_i$ of the non-local cell i for which the delay $\tau_i$ is less than the threshold $\tau_{TH}$ becomes greater than the coefficient $w_i$ of the non-local cell i for which the delay $\tau_i$ is greater than or equal to the threshold $\tau_{TH}$ ($\alpha > \beta$)>. Thus, the base station N4 sets the coefficient $w_i$ of the non-local cell i for which delay $\tau_i$ is relatively small, to be greater than the coefficient $w_i$ of the non-local cell i for which the delay $\tau_i$ is relatively large.

In a non-local cell i for which delay τi is small, the deviation between information such as scheduling information and pre-coding control information and the actual wireless propagation path state is small. Therefore, a non-local cell i for which delay $\tau_i$ is small, the reduction effect on interference that is consequent to cooperative communication is large. Consequently, by giving a large coefficient $w_i$ to and preferentially selecting as a cooperative cell, a non-local cell i for which the delay $\tau_i$ is small, the reduction effect on interference that is consequent to cooperative communication can be improved.

The base station N4 includes a delay acquirer that acquires the delay $\tau_i$ of intercellular communication between the local cell of the mobile station U1 and the non-local cell i. The delay acquirer of the base station N4, for example, is implemented by a computation circuit such as a CPU. For example, the delay $\tau_i$ of intercellular communication between the local cell of the mobile station U1 and the non-local cell i is preliminarily stored in the memory of the base station N4 and the delay acquirer of the base station N4 acquires the delay $\tau_i$ from the memory of the base station N4.

Further, the delay acquirer of the base station N4 may measure the delay $\tau_i$ of the intercellular communication. For example, the delay acquirer of the base station N4 transmits a response request signal to the non-local cell i and acquires the delay $\tau_i$ by measuring the time that elapses until a signal is received in response to the transmitted response request signal. The setter 11b sets the coefficient $w_i$ based on the delay $\tau_i$ acquired by the delay acquirer of the base station N4.

For example, the cells C42, C43 among the non-local cells i, are also managed along with the local cell (cell C41) of the mobile station U1, by the base station N4 and hence, the intercellular communication delay can be regarded as zero. Thus, according to equation 2, the cells C42, C43 are preferentially selected as cooperative cells. In this example, the cells C23, C42 are assumed to be selected as cooperative cells that are to perform cooperative transmission. Downlink cooperative transmission by the cell C41 and the cells C23, C42, which have been selected as cooperative cells, will be described.

Figure 4:
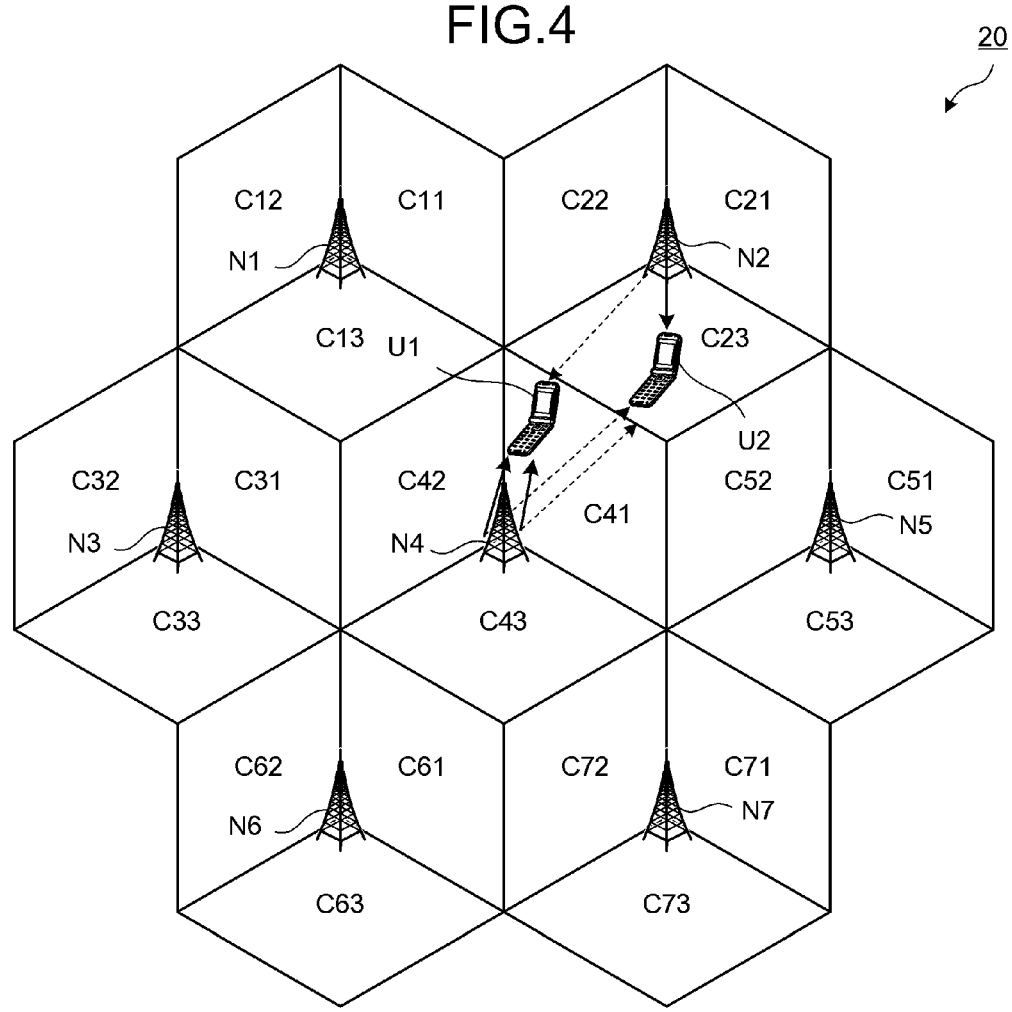
FIG. 4 is a diagram of downlink cooperative transmission.

FIG. 4 is a diagram of downlink cooperative transmission. In FIG. 4, components identical to those depicted in FIG. 2 are given the same reference numerals used in FIG. 2 and description thereof is omitted. In the example depicted in FIG. 4, the mobile station U1 is located in the cell C41. Furthermore, a mobile station U2 is located in the cell C23. For example, in the communication system 20, in cooperative cells managed by the same base station, JT is applied and in cooperative cells managed by different base stations, CB is applied.

For example, the base station N4 simultaneously transmits data from the cells C41, C42 to the mobile station U1 (JT). Further, the base station N4 performs beam forming with respect to signals to the mobile station U1 such that interference at the mobile station U2 is reduced (CB). The base station N2 further uses the cell C23 to transmit data to the mobile station U2 and further performs beam forming with respect to signals to the mobile station U2 such that interference at the mobile station U1 is reduced (CB).

Figure 5:
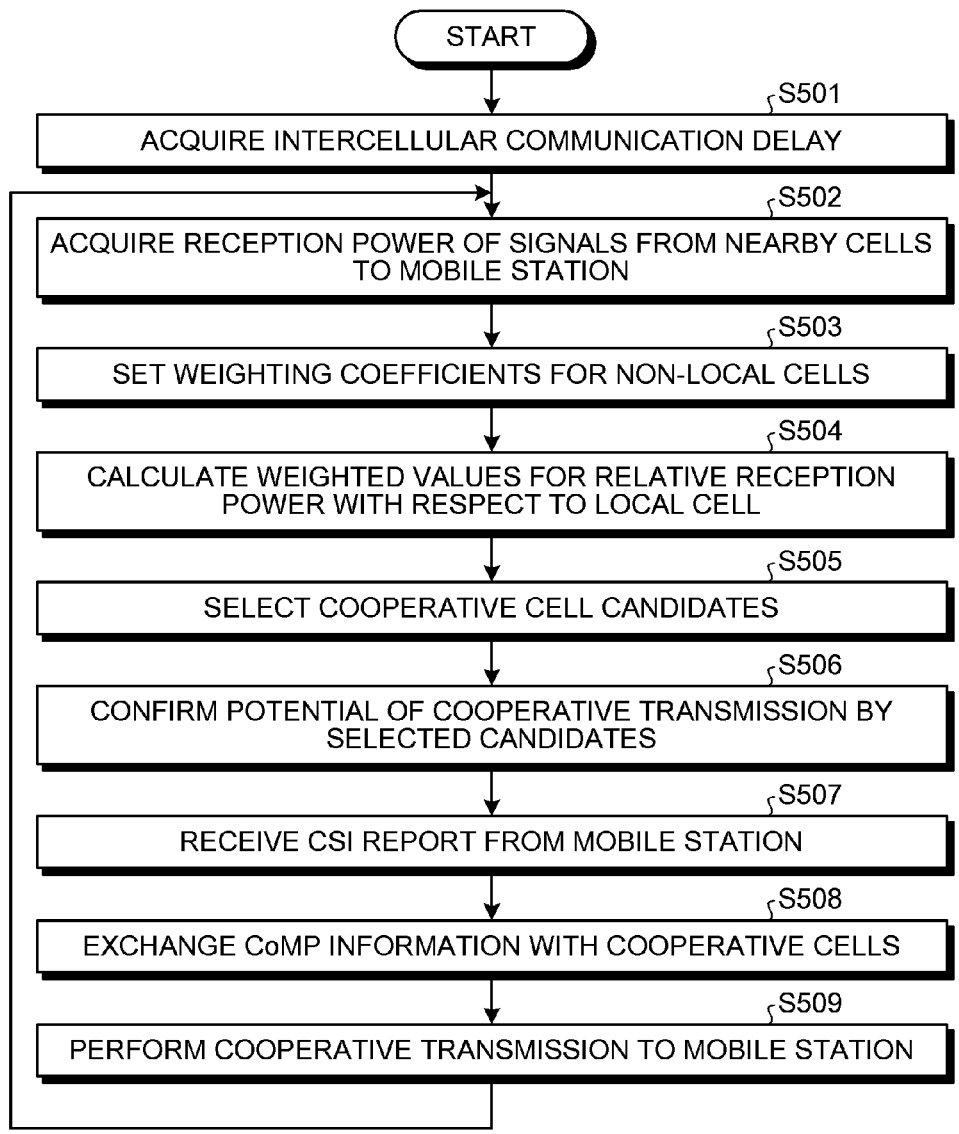
FIG. 5 is a flowchart of a first example of downlink operations of a base station.

FIG. 5 is a flowchart of a first example of downlink operations of the base station. Here, an example of operations of the base station N4, in a case where cooperative transmission to the mobile station U1 is performed will be described. The base station N4 acquires the delay $\tau_i$ of intercellular communication between the cell C41 of the mobile station U1 and the non-local cells i (step S501).

The base station N4 acquires from the mobile station U1, the reception power of each signal to the mobile station U1 from the nearby cells (step S502). The reception powers acquired at step S502 include the reception power $P_0$ from the local cell (the cell C41) of the mobile station U1 and the reception power $P_i$ from the non-local cells i. Based on the delays $\tau_i$ acquired at step S50, the base station N4 sets weighting coefficients $w_i$ for the non-local cells i (step S503).

Based on the reception powers acquired at step S502, the base station N4 calculates values for relative reception powers ($P_i/P_0$) from the non-local cells i, weighted by the weighting coefficients $w_i$ set at step S503 (step S504). The relative reception powers from the non-local cells i are each a ratio of the reception power $P_i$ from the non-local cell i to the reception power $P_0$ from the local cell (the cell C41) of the mobile station U1.

Based on the values calculated at step S504, the base station N4 selects cooperative cell candidates (step S505). The base station N4 confirms the potential of cooperative transmission by the cooperative cell candidate selected at step S505 (step S506). The base station N4 receives from the mobile station U1, a CSI report indicating the CSI measurement (step S507).

The base station transmits to and receives from the cooperative cells, coordinated multiple-point transmission and reception (CoMP) information (step S508). The cooperative cell with which CoMP information is exchanged at step S508 is, for example, a cell among the cooperative cell candidates selected at the step S505 and exclusive of cells for which cooperative transmission to the mobile station U1 has been confirmed as impossible at step S506.

The base station N4 performs cooperative transmission with the cooperative cell (with which CoMP information was exchanged at step S508) and the mobile station U1 (step S509), and returns to step S502. By recursively performing the above steps, the base station N4 can preferentially select as a cooperative cell, a non-local cell i for which the reduction effect on interference is great.

At step S501, the base station N4 by, for example, preliminarily storing the delays of communication between the base station N4 and the base stations N1 to N3, N5 to N7, acquires the intercellular communication delay $\tau_i$ for each cell. For example, the base station N4 acquires as the delay $\tau_i$ for the cell C23, the communication delay between the base station N4 and the base station N2. Further, since the cell C42 is a cell managed by the base station N4, the base station N4 acquires delay zero as the delay $\tau_i$ for the cell C42.

At step S502, the base station N4, for example, transmits to the mobile station U1, a nearby-cell measurement request requesting measurement of the reception power of reference signals from nearby cells. The mobile station U1, in response to the nearby-cell measurement request transmitted from the base station N4, measures the reception power of the reference signals from nearby cells and transmits the measurement results to the base station N4. Thus, the base station N4 can acquire the reception powers of the nearby cells.

At step S503, the base station N4, for example, sets the weighting coefficients according to equation 2. At step S504, the base station N4, for example, according to the left-hand term of expression 1, calculates a value of the relative reception power $P_i$ of another non-local cell i to the reception power $P_0$ of the local cell of the mobile station U1, weighted by the weighting coefficient $w_i$. At step S505, the base station N4, for example, according to expression 1, selects a cooperative cell candidate.

At step S506, the base station N4, for example, transmits a cooperative communication request to the base station that manages the cooperative cell candidate, and based on a cooperative communication request response transmitted in response to the cooperative communication request, confirms the potential of cooperative transmission. At step S507, the base station N4, for example, transmits to the mobile station U1, a CSI request requesting a CSI report and receives a CSI report transmitted from the mobile station U1 in response to the CSI request.

Further, reception of the CSI report and/or the exchange of the CoMP information may be performed periodically. For example, after step S509, the base station N4 returns to step S507, whereby even if wireless propagation characteristics change consequent to the movement of the mobile station U1, based on the periodically received CSI report and CoMP information, communication parameters can be updated and suitable cooperative transmission can be performed.

Figure 6:
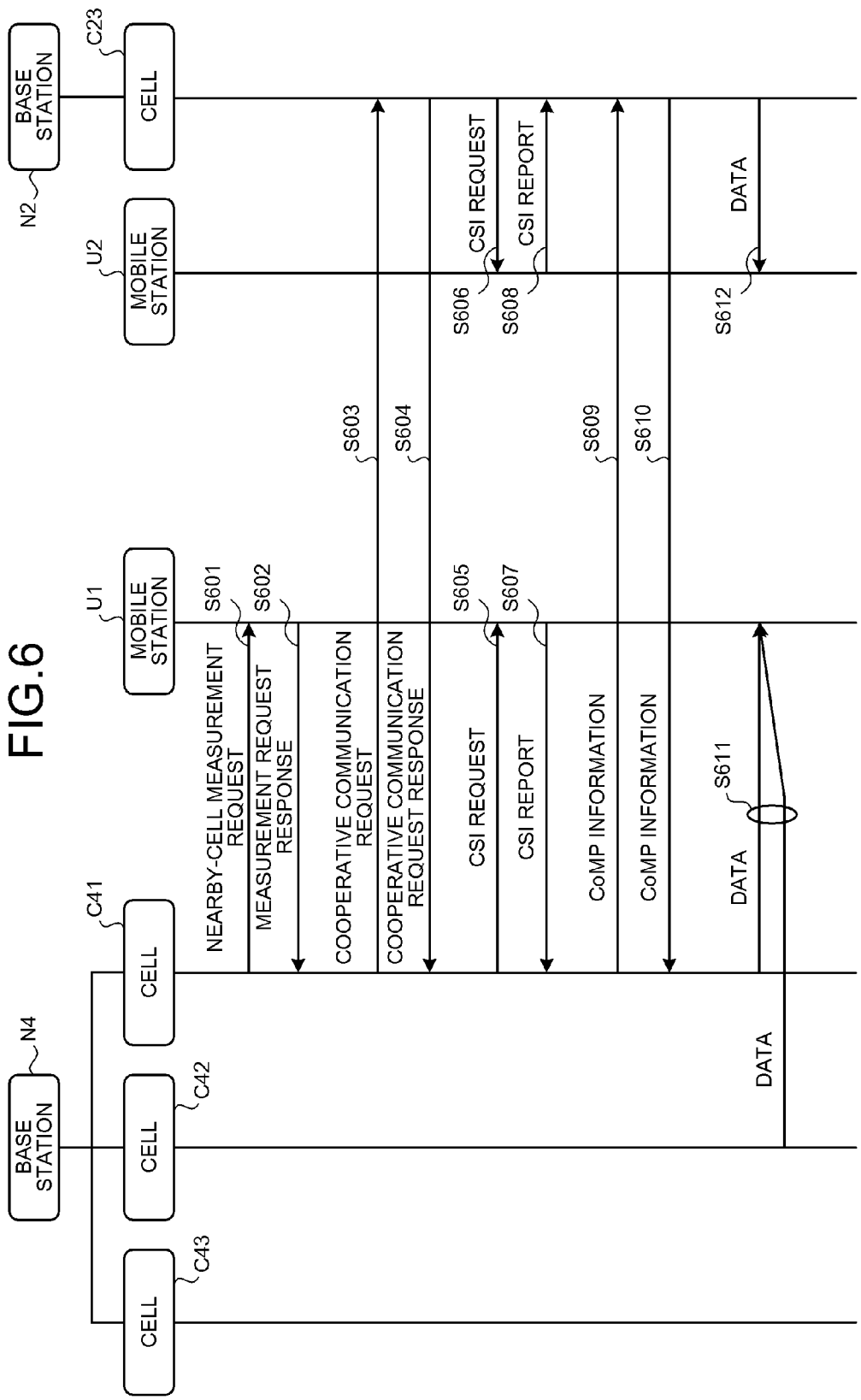
FIG. 6 is a sequence diagram of one example of processes for cooperative transmission for downlink communication.

FIG. 6 is a sequence diagram of one example of processes for cooperative transmission for downlink communication. The base station N4 uses the cell C41 and transmits a nearby-cell measurement request to the mobile station U1 (step S601). The nearby-cell measurement request is a signal requesting measurement of the reception powers of reference signals from nearby cells. The mobile station U1 transmits to the cell C41, a measurement request response to the nearby-cell measurement request transmitted at step S601 (step S602). The measurement request response includes the measurement results for the reception powers of the reference signals from the nearby cells.

The base station N4, based on the measurement results included in the measurement request response transmitted at step S602, selects cooperative cell candidates. In this example, the cell C23 and the cell C42 are selected as cooperative cell candidates. The base station N4 transmits a cooperative communication request to the base station N2, which manages the cell C23 selected as a cooperative cell candidate (step S603). Since the cell C42 is managed by the base station N4, the base station N4 need not transmit a cooperative communication request related to the cell C42.

The base station N2 transmits to the base station N4, a cooperative communication request response indicating the potential of the cooperative transmission requested by the cooperative communication request transmitted from the base station N4 at step S603 (step S604). In this example, a cooperative communication request response indicating that the cooperative transmission is possible is assumed to be transmitted from the base station N2 to the base station N4.

The base station N4 uses the cell C41 and transmits a CSI request to the mobile station U1 (step S605). The base station N2 uses the cell C23 and transmits a CSI request to the mobile station U2 (step S606). The CSI requests are signals requesting CSI measurement. The mobile station U1, in response to the CSI request transmitted at step S605, measures CSI and transmits to the cell C41, a CSI report indicating measurement results (step S607). The mobile station U2, in response to the CSI request transmitted at step S606, measures CSI and transmits to the cell C23, a CSI report indicating measurement results (step S608).

The base station N4 transmits CoMP information to the base station N2 (step S609). The base station N2 transmits CoMP information to the base station N4 (step S610). The CoMP information includes information necessary for cooperative transmission.

The base station N4 transmits data to the mobile station U1 by cooperative transmission (JT) via the cell C41 and the cell C42 (step S611). At step S611, the base station N4 further performs beam forming with respect to the signal to the mobile station U1 such that interference at the mobile station U2 is reduced (CB). Further, at step S611, based on the CSI report received at step S607 and the CoMP information received at step S610, cooperative transmission parameters are set.

The base station N2 transmits data to the mobile station U2 via the cell C23 (step S612). At step S612, the base station N2 further performs beam forming with respect to the signal to the mobile station U1 such that interference at the mobile station U1 is reduced (CB). Further, at step S612, based on the CSI report received at step S608 and CoMP information received at step S609, cooperative transmission parameters are set.

Figure 7:
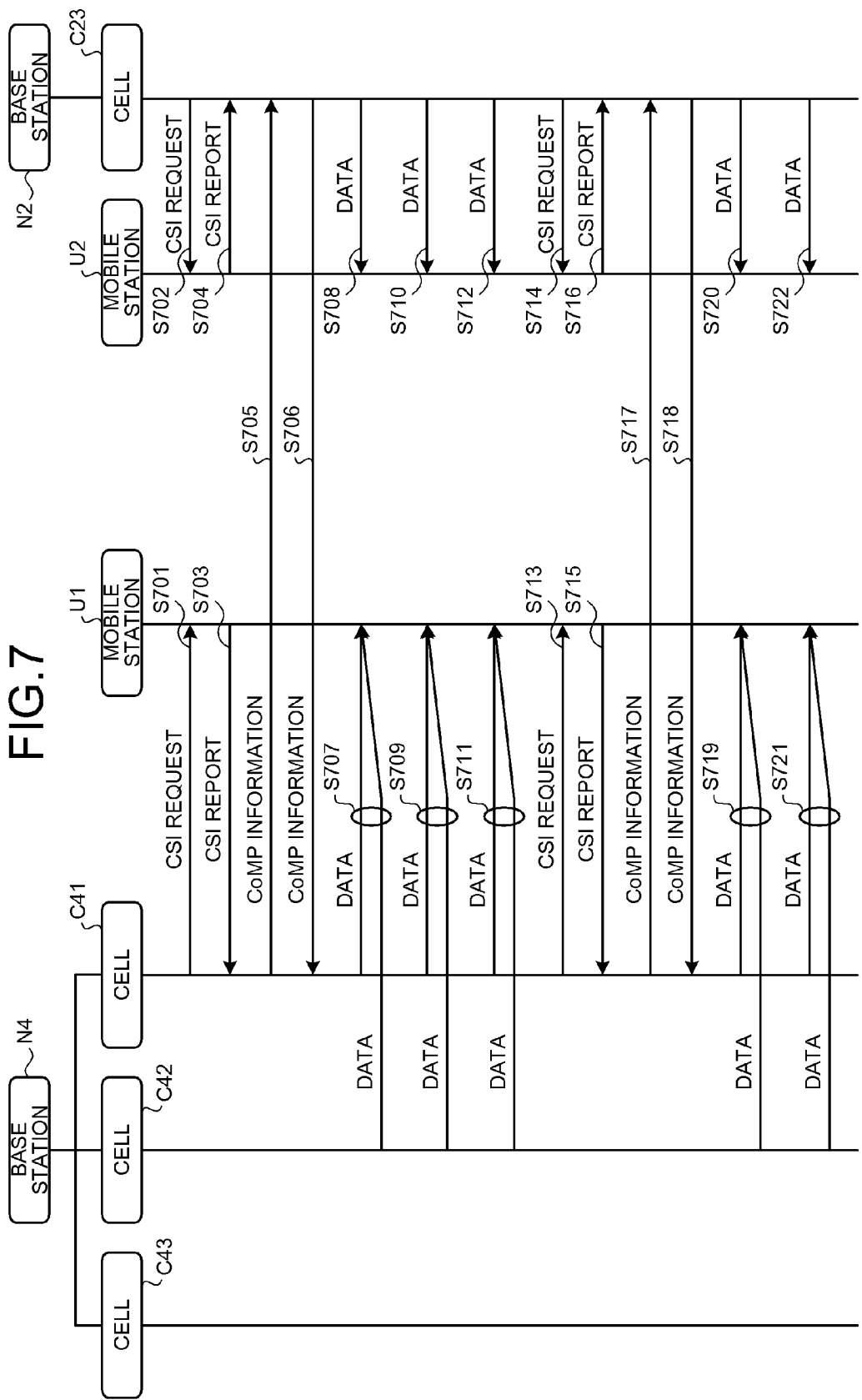
FIG. 7 is a sequence diagram of one example of periodic exchange of control information for downlink communication.

FIG. 7 is a sequence diagram of one example of periodic exchange of control information for downlink communication. In FIG. 7, a case where the reception of CSI reports and the exchange of CoMP information are performed periodically will be described. For example, after step S612 depicted in FIG. 6, the base station N4 uses the cell C41 and transmits a CSI request to the mobile station U1 (step S701). The base station N2 uses the cell C23 and transmits a CSI request to the mobile station U (step S702).

The mobile station U1 measures CSI in response to the CSI request transmitted at step S701 and transmits to the cell C41, a CSI report indicating the measurement results (step S703). The mobile station U2 measures CSI in response to the CSI request transmitted at step S702 and transmits to the cell C23, a CSI report indicating the measurement results (step S704). The base station N4 transmits CoMP information to the base station N2 (step S705). The base station N2 transmits CoMP information to the base station N4 (step S706).

The base station N4 transmits data to the mobile station U1 by cooperative transmission via the cell C41 and the cell C42 (step S707). The base station N2 transmits data to the mobile station U2 via the cell C23 (step S708). The base station N4 transmits data to the mobile station U1 by cooperative transmission via the cell C41 and the cell C42 (step S709). The base station N2 transmits data to the mobile station U2 via the cell C23 (step S710). The base station N4 transmits data to the mobile station U1 by cooperative transmission via the cell C41 and the cell C42 (step S711). The base station N2 transmits data to the mobile station U2 via the cell C23 (step S712).

At steps S707, S709, and S711, the base station N4 performs beam forming with respect to the signal to the mobile station U1 such that interference at the mobile station U2 is reduced. Further, at steps S707, S709, and S711, the base station N4 sets cooperative transmission parameters based on the CSI report received at step S703 and the CoMP information received at step S706.

At steps S708, S710, and S712, the base station N2 performs beam forming with respect to the signal to the mobile station U2 such that interference at the mobile station U1 is reduced. Further, at steps S708, S710, and S712, the base station N2 sets cooperative transmission parameters based on the CSI report received at step S704 and the CoMP information received at step S705.

Steps S713 to S722 are identical to steps S701 to S710 and description thereof will be omitted. In this manner, periodic reception of CSI reports and periodic exchange of CoMP information while cooperative transmission to the mobile station U1 and the mobile station U2 is performed, enables suitable cooperative transmission to be performed even if wireless propagation characteristics change consequent to the movement of the mobile station U1 and/or the mobile station U2.

Figure 8:
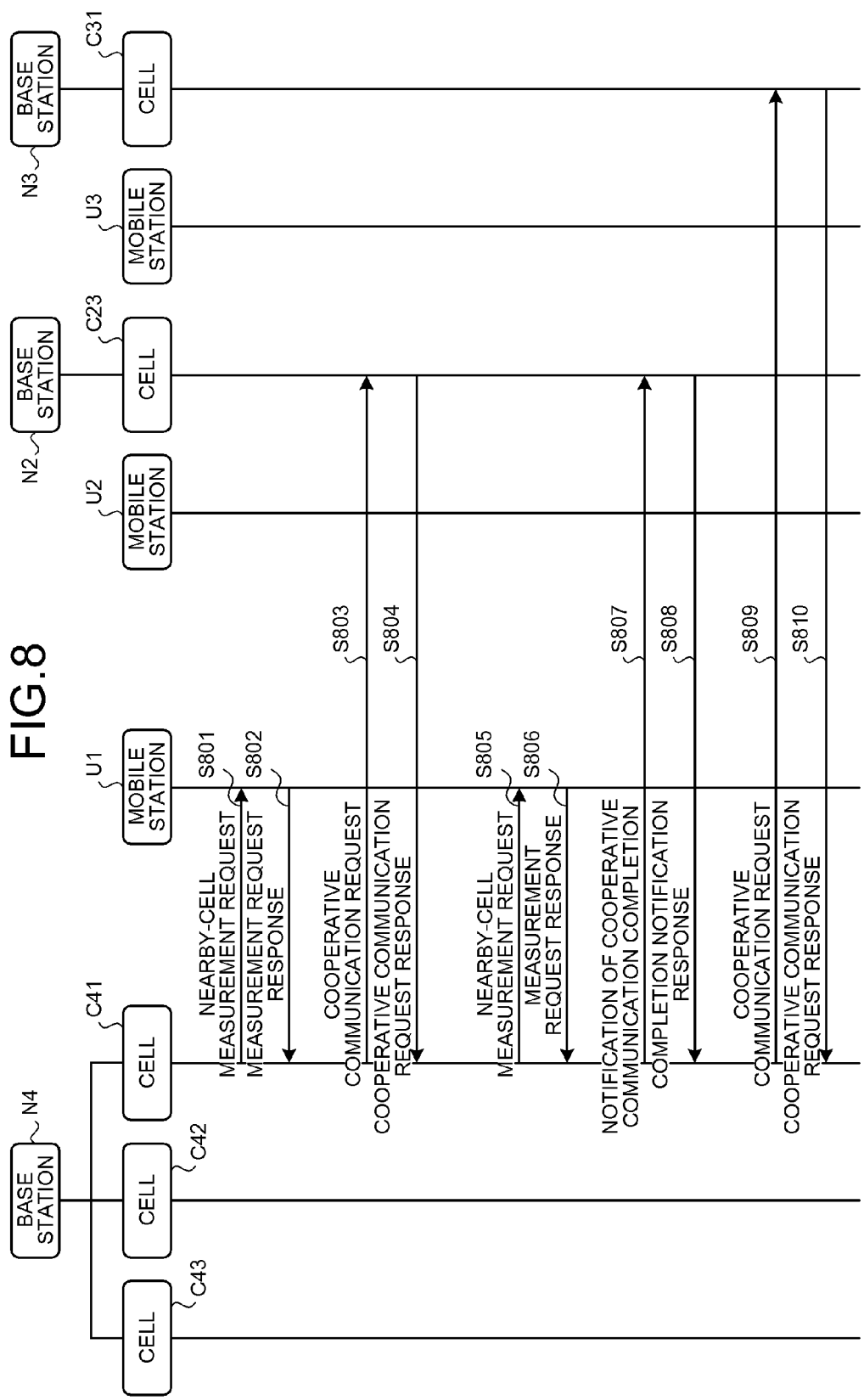
FIG. 8 is a sequence diagram of one example of periodic cooperative cell updating for downlink communication.

FIG. 8 is a sequence diagram of one example of periodic cooperative cell updating for downlink communication. Steps S801 to S804 depicted in FIG. 8 are identical to steps S601 to S604 depicted in FIG. 6. When a given period of time has elapsed after step S804, the base station N4 uses the cell C41 to transmit a nearby-cell measurement request to the mobile station U1 (step S805).

The mobile station U1 transmits to the cell C41, a measurement request response in response to the nearby-cell measurement request transmitted at step S805 (step S806). The base station N4, based on measurement results included in the measurement request response transmitted at step S806, selects cooperative cell candidates. In this example, the cell C31 and the cell C42 are assumed to be selected as cooperative cell candidates.

The base station N4 transmits notification of cooperative communication completion to the base station N2, which manages the cell C23 not selected as a cooperative cell candidate (step S807). The base station N2 transmits to the base station N4, a completion notification response that is in response to the notification of cooperative communication completion transmitted at step S807 (step S808).

The base station N4 transmits a cooperative communication request to the cell C31 selected as a cooperative cell candidate (step S809). The base station N3 transmits to the base station N4, a cooperative communication request response indicating the potential of the cooperative transmission requested by the cooperative communication request transmitted at step S809 (step S810). In this example, a cooperative communication request response indicating that the cooperative transmission is possible, is assumed to be transmitted from the base station N3 to the base station N4.

Thus, cooperative transmission using the cell C23 and the cell C42 can be switched to cooperative transmission using the cell C31 and the cell C42. In this manner, the reception power at the mobile station U1 is periodically measured and the cooperative cells are updated, enabling suitable cooperative transmission to be performed, even if wireless propagation characteristics change consequent to the movement of the mobile station U1.

The setting weighting of coefficient based on traveling speed of mobile station will be described. The base station N4 may set the coefficient $w_i$ of expression 1 by, for example, equation 3. In equation 3, delay $\tau_I$ is the delay of intercellular communication between the local cell (cell C41) of the mobile station U1 and the non-local cell i. Estimated speed $v_j$ is the estimated speed of a mobile station j in the local cell (cell C41) of the mobile station j. Threshold $c_{TH}$ is a threshold of the product of the delay $\tau_i$ and the estimated speed $v_j$.

$$w_i = \begin{cases} \alpha & (\text{if } v_j\tau_i < c_{TH}) \\ \beta & (\text{if } v_j\tau_i \geq c_{TH}) \end{cases} \quad (\alpha > \beta) \quad (3)$$

Thus, the coefficient $w_i$ of a non-local cell i for which the product of the delay $\tau i$ and the estimated speed $v_j$ is less than the threshold $c_{TH}$ is greater than the coefficient $w_i$ of a non-local cell i for which the product of the delay $\tau_i$ and the estimated speed $v_j$ is greater than or equal to the threshold $c_{TH}$ ($\alpha > \beta$). In this manner, the base station N4 sets the coefficient $w_i$ of a non-local cell i for which the product of the intercellular communication delay and the estimated speed is relatively small, to be greater than the intercellular communication coefficient $w_i$ of a non-local cell i for which the product of the intercellular communication delay and the estimated speed is relatively large.

In a non-local cell i for which the intercellular communication delay is small, the deviation between information (such as scheduling information and pre-coding control information) and the actual wireless propagation path state is small. Further, this deviation becomes smaller, the slower the traveling speed of the mobile station is. Therefore, for a non-local cell i for which the product of the delay $\tau_i$ and the estimated speed $v_j$ is small, the reduction effect on interference that is consequent to cooperative communication is large. Consequently, the coefficient $w_i$ of a non-local cell i for which the product of the delay $\tau_i$ and the estimated speed $v_j$ is small is made large and the non-local cell i is preferentially selected as a cooperative cell, whereby the reduction effect on interference that is consequent to cooperative communication can be improved.

The base station N4 includes an estimator that estimates as the estimated speed $v_j$, the traveling speed of the mobile station U1. The estimator of the base station N4 is, for example, implemented by a computing circuit such as a CPU. The estimator of the base station N4, for example, periodically estimates the traveling speed of each mobile station for handover in the cells C41 to C43 managed by the base station N4. The setter 11b sets each coefficient $w_i$, based on the estimated speeds $v_j$ estimated by the estimator of the base station N4.

Figure 9:
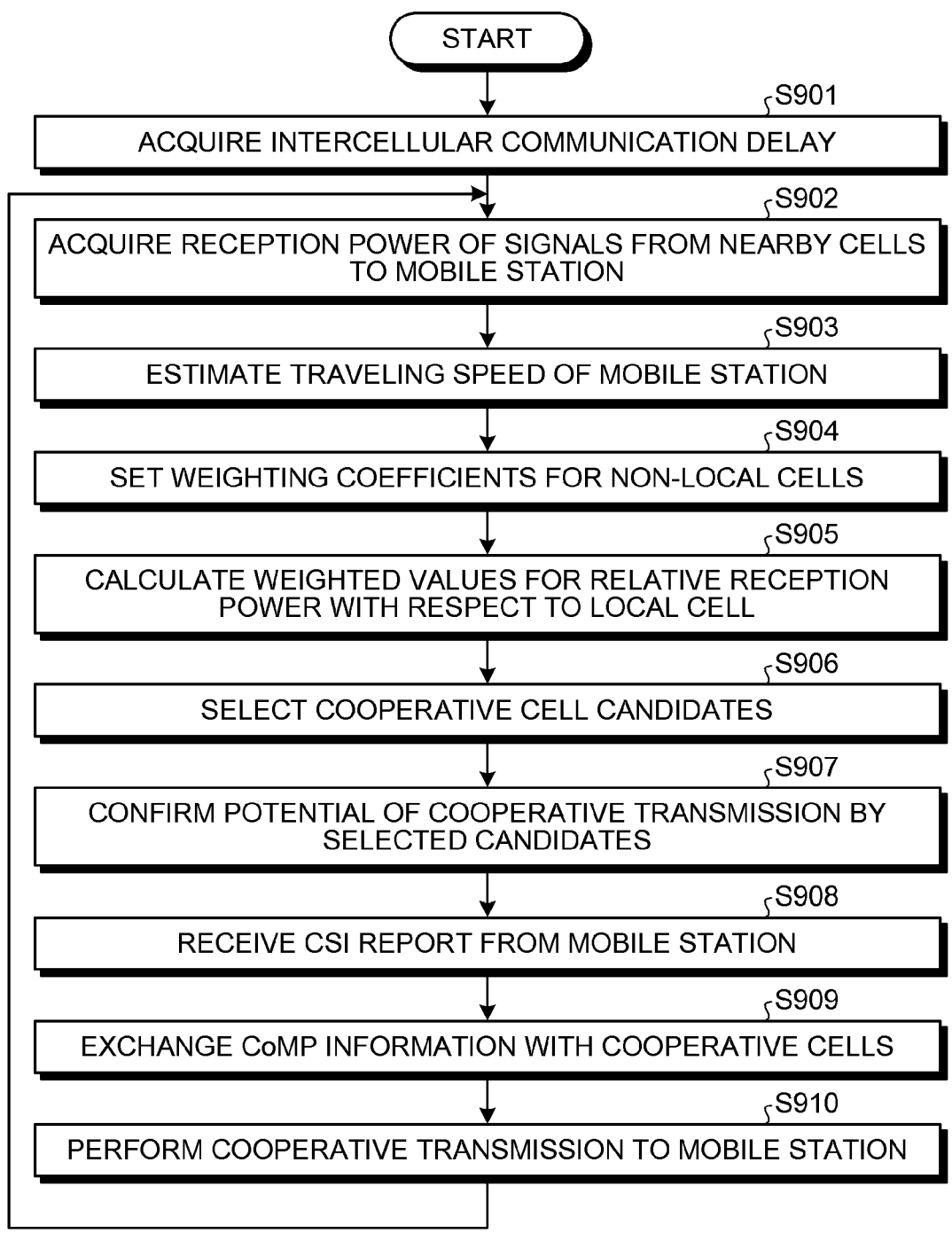
FIG. 9 is a flowchart of a second example of downlink operations of the base station.

FIG. 9 is a flowchart of a second example of downlink operations of the base station. Here, an example of operations of the base station N4 will be described for a case where the coefficient $w_i$ is set based on the product of the delay $\tau_I$ and the estimated speed $v_j$. Steps S901, S902 depicted in FIG. 9 are identical to steps S501, S502 depicted in FIG. 5 and description thereof will be omitted. Subsequent to step S902, the base station N4 estimates the traveling speed of the mobile station U1 (step S903).

Steps S904 to S910 depicted in FIG. 9 are identical to steps S503 to S509 depicted in FIG. 5. However, at step S904, the weighting coefficient $w_i$ of the non-local cell i is set based on the delay $\tau_i$ acquired at step S901 and the estimated speed $v_j$ of the mobile station U1, estimated at step S903 (step S904).

Thus, the estimated speed $v_j$ of the mobile station U1 is estimated; and based on the delay $\tau_i$ and the estimated speed $v_j$, the weighting coefficient $w_i$ of the non-local cell i is set, thereby enabling a non-local cell i having a large reduction effect on interference to be preferentially selected as a cooperative cell.

The setting of weight coefficients, based on the applicable cooperative communication scheme will be described. The base station N4 may set the coefficient $w_i$ of expression 1 by, for example, equation 4. In equation 4, condition "JT can be used" is a condition indicating that JT is applicable in a non-local cell i. Condition "only CB/CS can be used" is a condition indicating that in a non-local cell i, only CB or CS is applicable and JT is not applicable.

$$w_i = \begin{cases} \alpha & (\text{if } JT \text{ can be used}) \\ \beta & (\text{if only } CB/CS can \text{ be used}) \end{cases} \quad (\alpha > \beta) \quad (4)$$

Thus, the coefficient $w_i$ of a non-local cell i for which JT is applicable is greater than the coefficient $w_i$ of a non-local cell i for which JT is not applicable ($\alpha > \beta$). In this manner, the base station N4 sets the coefficient $w_i$ of a non-local cell i according to an applicable cooperative communication scheme.

A non-local cell i for which JT is applicable has a large reduction effect on interference that is consequent to cooperative communication as compared to a non-local cell i for which JT is not applicable. Consequently, the coefficient $w_i$ of a given non-local cell i for which JT applicable is made greater than the coefficient $w_i$ of a non-local cell i for which JT is not applicable and the given non-local cell i is preferentially selected as a cooperative cell, thereby enabling the reduction effect on interference that is consequent to cooperative communication to be improved.

The base station N4 includes a scheme acquirer that acquires the cooperative communication scheme applicable to a non-local cell i. The scheme acquirer of the base station N4, for example, is implemented by a computing circuit such as a CPU. For example, information that includes a cooperative communication scheme applicable to the non-local cell i is preliminarily stored to a memory of the base station N4 and the scheme acquirer of the base station N4 acquires from the memory of the base station N4, the applicable cooperative communication scheme for the non-local cell i.

The scheme acquirer of the base station N4 may receive from a non-local cell i, a cooperative communication scheme that is applicable to the non-local cell i. For example, the scheme acquirer of the base station N4 transmits to a scheme notification request to a non-local cell i and acquires a cooperative communication scheme applicable to the non-local cell i, from information notified by the non-local cell i in response to the transmitted scheme notification request. The setter 11b sets the coefficient $w_i$ based on the cooperative communication scheme acquired by the scheme acquirer of the base station N4.

Figure 10:
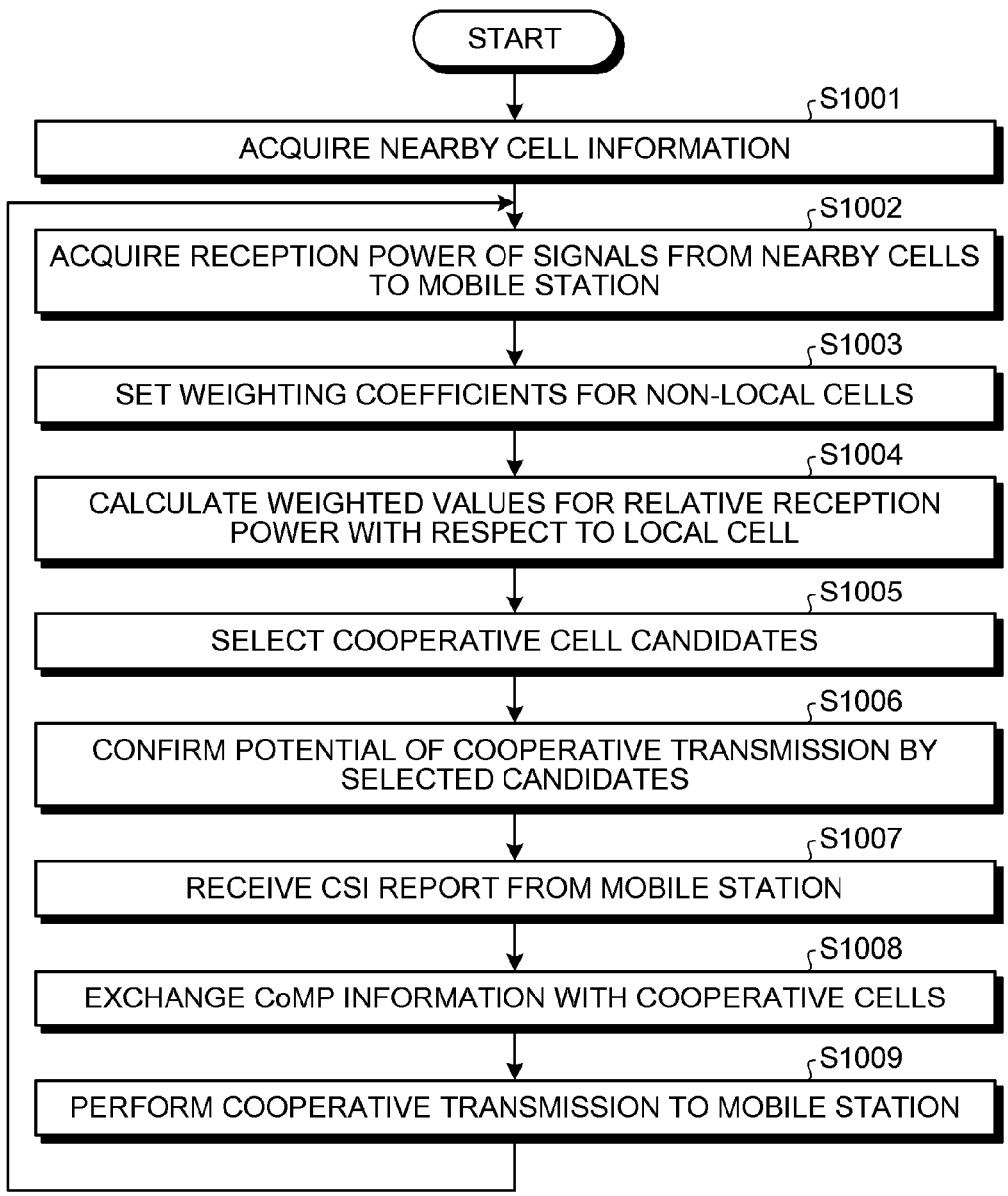
FIG. 10 is a flowchart of a third example of downlink operations of the base station.
Figure 11:
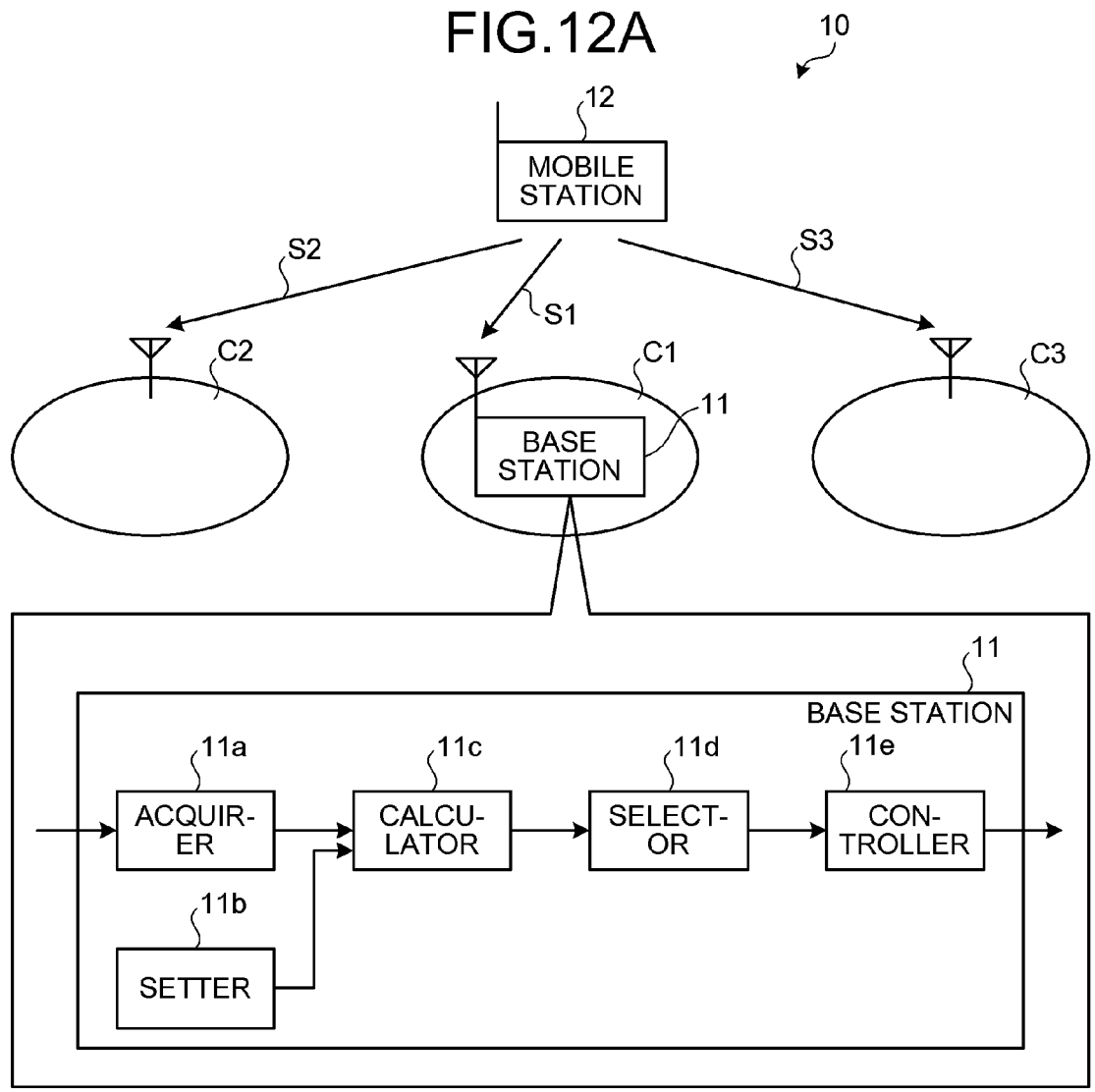
FIG. 11 is a diagram of an example of parameters and weighting functions.

FIG. 10 is a flowchart of a third example of downlink operations of the base station. Here, an example of operations of the base station N4 will be described for a case where the coefficient $w_i$ is set based on the applicable cooperative communication scheme. The base station N4 acquires nearby cell information related to nearby cells of the mobile station U1 (step S1001). The nearby cell information includes information indicating the cooperative communication scheme applicable to the non-local cell i.

Steps S1002 to S1009 depicted in FIG. 10 are identical to steps S502 to S509 depicted in FIG. 5. However, at step S1003, the weighting coefficient wi of the non-local cell i is set based on the applicable cooperative communication scheme of the non-local cell i, indicated in the nearby cell information acquired at step S1001.

Thus, the nearby cell information is acquired and based on the applicable cooperative communication scheme of the non-local cell i, the weighting coefficient $w_i$ of the non-local cell i is set, thereby enabling a non-local cell i having large reduction effect on interference that is consequent to cooperative communication, to be selected as a cooperative cell.

The setting of weighting coefficients based on parameters will be described. The base station N4 may set the coefficient $w_i$ of expression 1 by, for example, equation 5. In equation 5, a weighting function $f_k$ is a weighting function by a k-th parameter. $x_k$ is the k-th parameter and c is a constant.

$$w_i = c \prod_k f_k(x_k) \qquad (5)$$

FIG. 1A is a diagram of an example of the parameters and weighting functions. The memory of the base station N4 stores therein, for example, a table 1100 depicted in FIG. 1A. The table 1100 associates k-th parameters (k=1 to 5) and weighting functions $f_k$. The first parameter is the intercellular communication delay for the non-local cell i and for example, is the delay $\tau_i$. The weighting function $f_1$ corresponding to the first parameter is a function that decreases as the delay increases.

The second parameter is the traveling speed of the mobile station and for example, is the estimated speed $v_j$. The weighting function $f_2$ corresponding to the second parameter is a function that decreases as the traveling speed increases. The third parameter is the cooperative communication scheme applicable in the non-local cell i. The weighting function $f_3$ corresponding to the third parameter is a function that is greater when JT is applicable as compared to when CB or CS is applicable (when JT is not applicable).

The fourth parameter is a transmission antenna count for the non-local cell i. The weighting function $f_4$ corresponding to the fourth parameter is a function that decreases as the antenna count decreases. The fifth parameter is the number of users for which communication is multiplexed in the non-local cell i. The weighting function $f_5$ corresponding to the fifth parameter is a function that decreases as the number of users increases.

For example, the setter 11b of the base station N4 receives from each base station, nearby cell information that includes information such as the third and fourth parameters; and uses the received nearby cell information, the table 1100, and equation 5 to set the coefficient $w_i$ of the non-local cell i.

Thus, the base station according to the first embodiment enables a cell having a large reduction effect on interference to be preferentially selected as a cooperative cell for cooperative transmission, by selecting the cooperative cell based on the reception power of each cell, weighted by the coefficient set for the cell. Consequently, interference is reduced, enabling communication quality to be improved. Further, cells for which the reduction effect on interference is small are excluded from the cooperative cells, whereby the number of cooperative cells that communicate to perform the cooperative transmission, the measurement processing at the mobile station, and the volume of feedback information from the mobile station to the base station can be decreased.

In the first embodiment, cooperative transmission for downlink communication was described. In a second embodiment, cooperative reception for uplink communication will be described.

Figure 12:
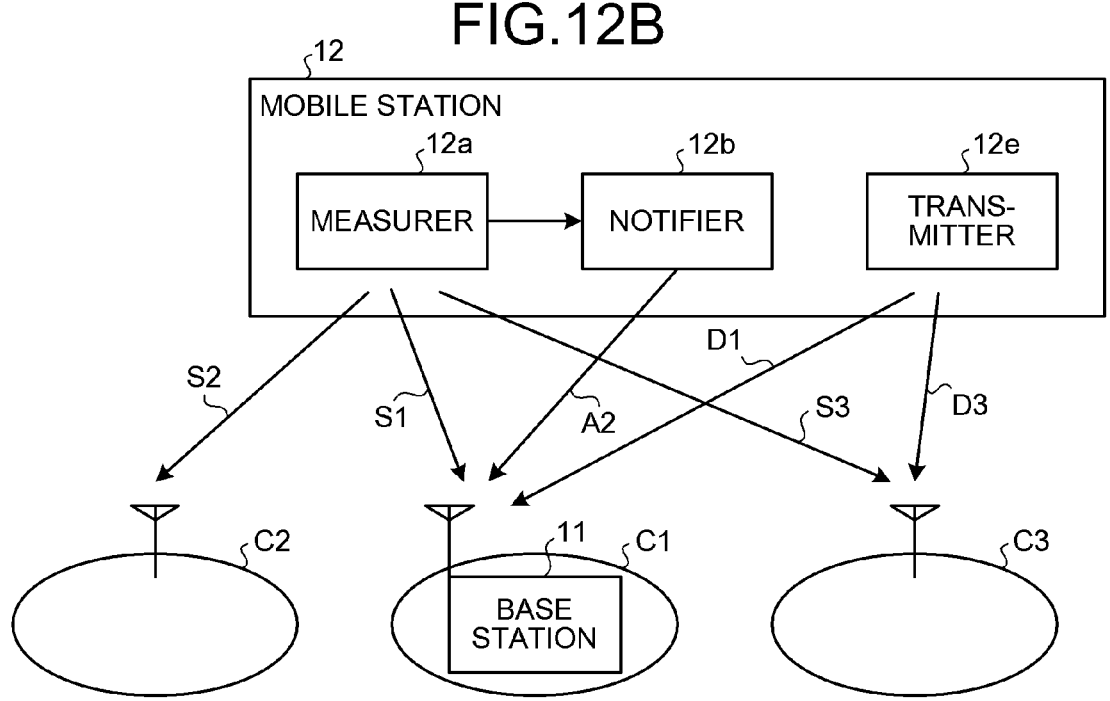
FIG. 12A is a block diagram of the communication system according to a second embodiment.
FIG. 12B is a block diagram of the mobile station according to the second embodiment.

FIG. 12A is a block diagram of the communication system according to a second embodiment. In FIG. 12A, components identical those depicted in FIGS. 1A and 1B are given the same reference numerals used in FIGS. 1A and 1B, and description thereof is omitted. The communication system 10 depicted in FIG. 12A is a communication system that performs cooperative reception with respect to the mobile station 12, via cooperative cells. The base station 11 is a base station that requests base stations forming nearby cells (e.g., cells C2, C3) of the mobile station 12 to perform cooperative reception.

The acquirer 11a of the base station 11 acquires the interference power from the mobile station 12 to the nearby cells of the mobile station 12. For example, the acquirer 11a acquires the interference power of the local cell (cell C1) of the mobile station 12 and the interference power for each of the non-local cells (cells C2, C3) that are different from the local cell of the mobile station 12. The acquirer 11a notifies the calculator 11c of each acquired propagation loss.

For example, the acquirer 11a acquires, as the interference power from the mobile station 12 to the nearby cell, the propagation loss for each downlink reference signal transmitted from the nearby cells to the mobile station 12. For example, the acquirer 11a transmits to the mobile station 12, a nearby cell estimation request requesting estimation of the propagation loss from the mobile station 12 to the nearby cells. The mobile station 12, in response to the nearby cell estimation request from the acquirer 11a, estimates the propagation loss of the reference signals from the cells C1 to C3 and transmits the estimation results to the base station 11. The acquirer 11a acquires the propagation losses transmitted from the mobile station 12.

Alternatively, the acquirer 11a may acquire from the cells C1 to C3 and as the interference power from the mobile station 12 to the nearby cells, the propagation loss of each uplink reference signal S1 to S3 transmitted from the mobile station 12 to the cells C1 to C3. For example, the acquirer 11a transmits to the mobile station 12, a nearby cell estimation request requesting estimation of the propagation loss from the mobile station 12 to the nearby cells. The mobile station 12, in response to the nearby cell estimation request from the acquirer 11a, transmits reference signals S1 to S3 to the cells C1 to C3. The mobile station 12 receives from the cells C1 to C3, the propagation losses estimated by the cells C1 to C3 based on the reference signals S1 to S3; and transmits the received propagation losses to the base station 11. The acquirer 11a acquires the propagation losses transmitted from the mobile station 12.

The calculator 11c calculates values for the interference powers notified by the acquirer 11a, weighted by coefficients notified by the setter 11b. For example, the calculator 11c calculates a ratio of the interference power of each non-local cell with respect to the interference power of the local cell, weighted by the corresponding coefficient. In other words, the calculator 11c calculates an interference power ratio for the cell C1 and the cell C2, weighted by the coefficient for the cell C2; and an interference power ratio for the cell C1 and the cell C3, weighted by the coefficient of the cell C3. The calculator 11c notifies the selector 11d of the calculated values.

The controller 11e uses the cooperative cell notified by the selector 11d to perform cooperative reception with respect to the mobile station 12. For example, if the cell C2 is selected as a cooperative cell by the selector 11d, the controller 11e uses the cell C1 (which is the local cell of the mobile station 12) and the cell C2 (which has been selected as a cooperative cell) and performs cooperative reception with respect to the mobile station 12.

For example, if the cell C2 is a cell managed by the base station 11, the controller 11e controls the cell C1 and the cell C2 such that the cell C1 and the cell C2 cooperate and receive data. Further, if the cell C2 is a cell that is managed by a base station is different from the base station 11, the controller 11e transmits to the base station managing the cell C2, a cooperative communication request to receive cooperation with the data reception by the cell C1 and the reception of data.

FIG. 12B is a block diagram of the mobile station according to the second embodiment. In FIG. 12B, components identical to those depicted in FIG. 1B are given the same reference numerals used in FIG. 1B and description thereof is omitted. As depicted in FIG. 12B, the mobile station 12 according to the second embodiment includes an estimator 12d, the notifier 12b, and a transmitter 12e.

The estimator 12d estimates the interference power from the mobile station 12 to the nearby cells (cells C1 to C3). The estimator 12d outputs the estimated interference powers to the notifier 12b. The notifier 12b notifies the base station 11 of the interference powers output from the estimator 12d (reference numeral A2). For example, when a nearby cell estimation request is transmitted from the base station 11, the estimator 12d estimates the interference power to the nearby cells and the notifier 12b transmits the estimation results to the base station 11.

Thus, the base station 11 calculates values for the interference power from the mobile station 12 to the nearby cells, weighted by the coefficients set for the nearby cells of the mobile station 12; and based on the calculated values, selects cooperative cells. The transmitter 12e of the mobile station 12 transmits data to be cooperatively received using the cooperative cells selected by the base station 11.

Thus, the transmitter 12e can transmit data that is to be cooperatively received by a portion of or all of the cells selected from among the nearby cells, the cells being selected based on the values of the interference power from the mobile station 12 to the nearby cells and the values being weighted by the nearby-cell-specific coefficients. For example, the transmitter 12e transmits data D1, D3 to be cooperatively received by the cell C1 and the cell C2.

Figure 13:
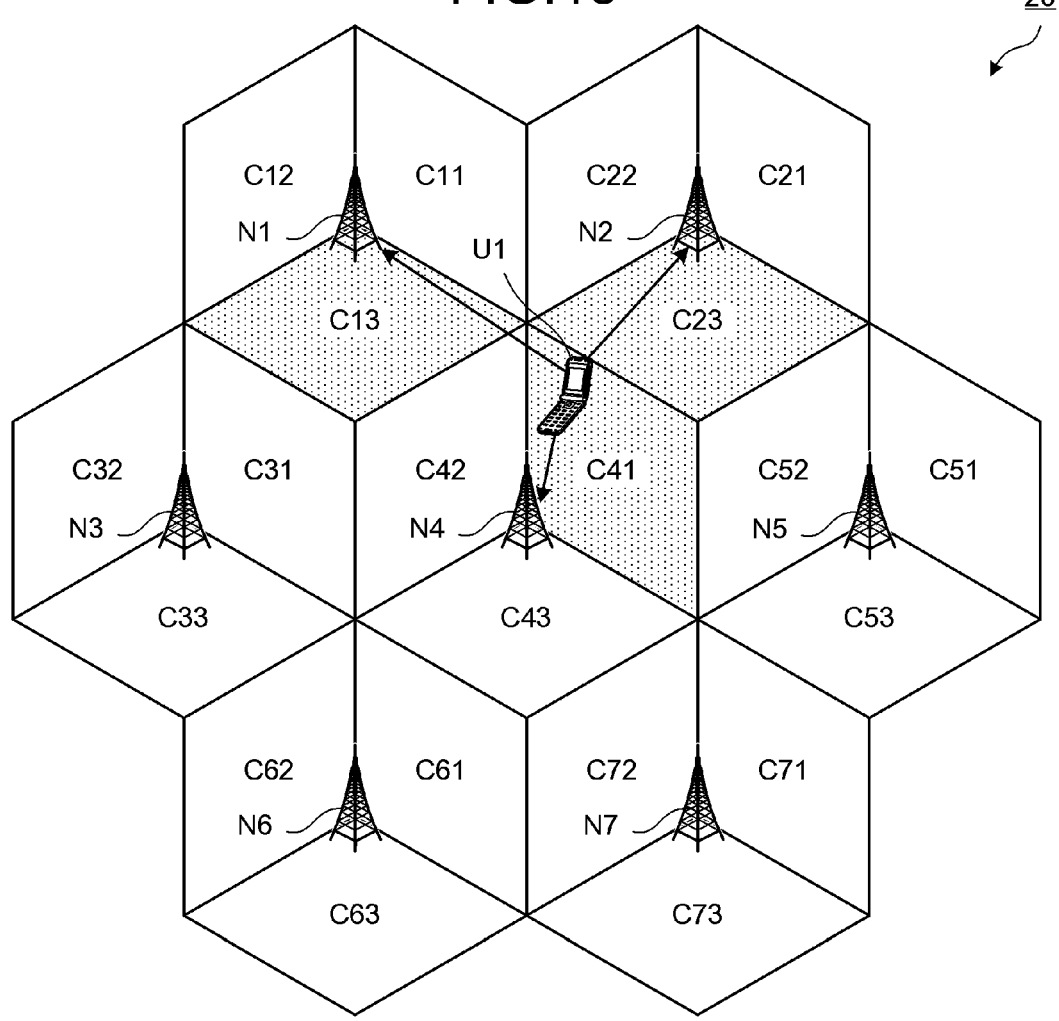
FIG. 13 is a diagram of a first example of cooperative reception for uplink communication.

FIG. 13 is a diagram of a first example of cooperative reception for uplink communication. In FIG. 13, components identical to those depicted in FIG. 2 are given the same reference numerals used in FIG. 2 and description thereof is omitted. In this example, in the communication system 20, cooperative reception is assumed where the cell C41, which is the local cell of the mobile station U1, and other cells such as the cell C13 and the cell C23 are used to cooperatively receive data from the mobile station U1.

Selection of cooperative cells by the base station N4 will be described. Here, from among the non-local cells i of the mobile station U1, the base station N4 selects as a cooperative cell, a non-local cell i that for example, satisfies expression 6.

$$\frac{w_i PL_i}{PL_0} \geq \gamma \qquad (6)$$

In expression 6, propagation loss $PL_0$ is the propagation loss of the reference signal from the mobile station U1 to the local cell (cell C41) of the mobile station U1. Propagation loss $PL_i$ is the propagation loss of the reference signal from mobile station U1 to the non-local cell i. The coefficient $w_i$ is the weighting coefficient of the non-local cell i. $\gamma$ is a threshold. The setting of the coefficient $w_i$ is identical to the setting of the coefficient $w_i$ described in the first embodiment and description thereof is omitted.

Figure 14:
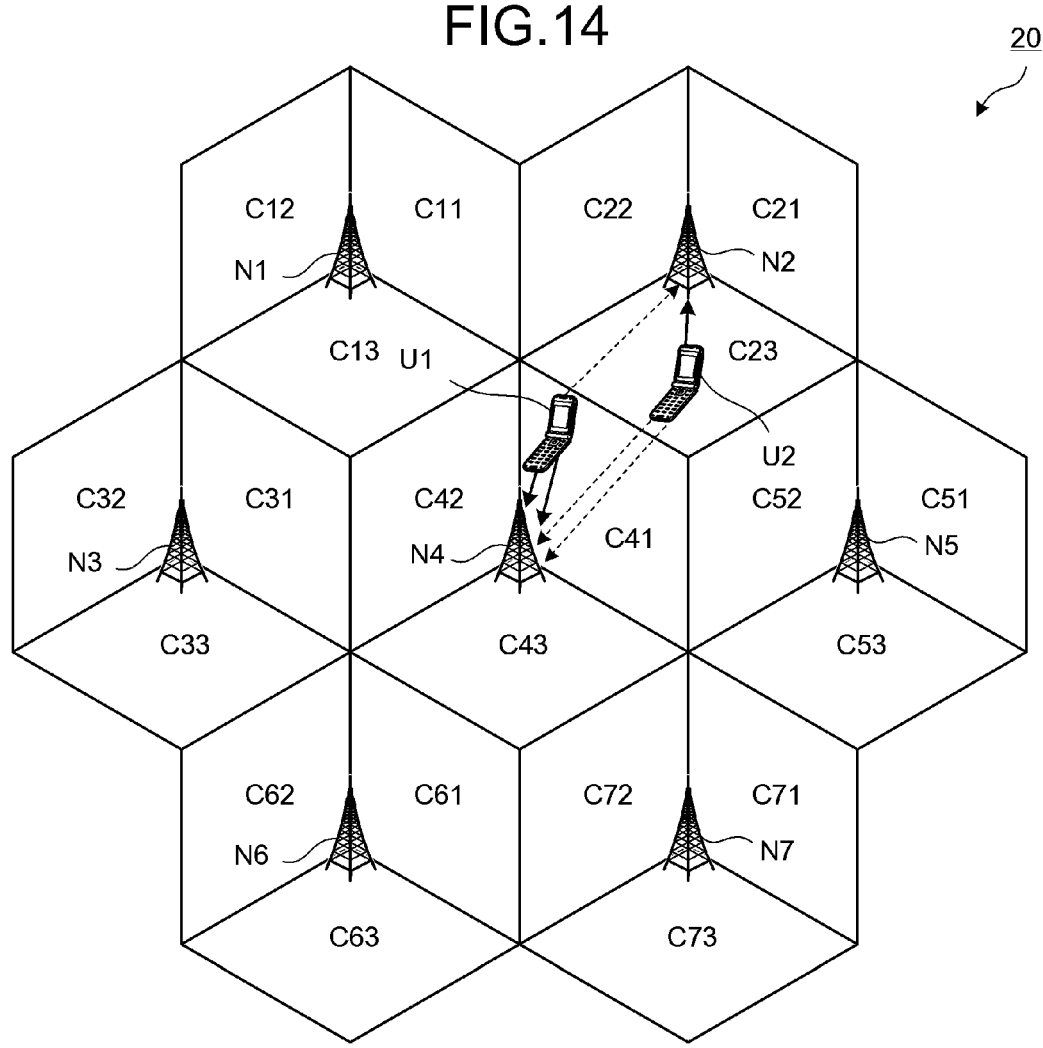
FIG. 14 is a diagram of a second example of cooperative reception for uplink communication.

FIG. 14 is a diagram of a second example of cooperative reception for uplink communication. In FIG. 14, components identical to those depicted in FIG. 4 and FIG. 13 are given the same reference numerals used in FIGS. 4 and 13, and description thereof is omitted. In the communication system 20, the base station N4 simultaneously receives data from the mobile station U1 via the cells C41, C42 (JT). The mobile station U1 performs beam forming with respect to the signal to the cells C41, C42 such that interference at the cell C23 is reduced (CB).

The base station N2 uses the cell C23 to receive data from the mobile station U2. The mobile station U2 performs beam forming with respect to the signal to the cell C23 such that interference at the cells C41, C42 is reduced (CB).

FIG. 15 is a flowchart of a first example of uplink operations of the base station. Here, an example of operations of the base station N4, in a case where cooperative reception of data from the mobile station U1 is performed. The base station N4 acquires the delay $\tau_i$ of intercellular communication between the cell C41 and each of the non-local cells i of the mobile station U1 (step S1501).

The base station N4 acquires the propagation loss that is between the mobile station U1 and each of the nearby cells and estimated by the mobile station U1 (step S1502). The propagation loss between the mobile station U1 and each of the nearby cells includes the propagation loss $PL_0$ of the local cell (cell C41) the mobile station U1 and propagation loss $PL_i$ of the non-local cell i. Based on the delays $\tau_i$ acquired at step S1501, the base station N4 sets the weighting coefficients $w_i$ for the non-local cells i (step S1503).

Based on the propagation losses acquired at step S1502, the base station N4 calculates values for relative propagation losses, weighted by the weighting coefficients $w_i$ set at step S1503 (step S1504). A relative propagation loss is a ratio of the propagation loss $PL_i$ of the non-local cell to the propagation loss $PL_0$ of the local cell of the mobile station U1. Based on the values calculated at step S1504, the base station N4 selects cooperative cell candidates (step S1505).

The base station N4 confirms the potential of cooperative reception by the cooperative cell candidates selected at step S1505 (step S1506). The base station N4 exchanges CoMP information with the cooperative cells (step S1507). The cooperative cells with which CoMP information is exchanged, are, for example, cells among the cooperative cell candidates selected at step S1505 and exclusive of cells for which cooperative reception has been confirmed as impossible at step S1506. The CoMP information, for example, are values, such as scheduling and antenna weighting information for cooperative reception, calculated based on estimation results obtained by performing uplink propagation path estimation based on reference signals from the mobile station U1.

The base station N4, together with cooperative cells with which the CoMP information was exchanged at step S1507, performs cooperative reception of the data from the mobile station U1 (step S1508), and returns to step S1502. By recursively performing the steps above, the base station N4 can select as a cooperative cell, a non-local cell i having a large reduction effect on interference.

At step S1502, the base station N4, for example, transmits to the mobile station U1, a nearby cell estimation request requesting estimation of the propagation loss from the mobile station U1 to each nearby cell. The mobile station U1, in response to the nearby cell estimation request transmitted from the base station N4, estimates the propagation loss for each nearby cell and transmits the estimation results to the base station N4, whereby the base station N4 is able to acquire the propagation loss for each nearby cell.

At step S1504, by expression 6, the base station N4, for example, calculates a value that is weighted by the weighting coefficient $w_i$ and for the relative propagation loss of the non-local cell $P_i$ with respect to the propagation loss $PL_0$ of the local cell of the mobile station U1. The exchange of CoMP information may be performed periodically. For example, configuration may be such that after step S1508, the base station N4 returns to step S1507. Consequently, even if wireless propagation characteristics change consequent to the movement of the mobile station U1, communication parameters can be updated based on the periodically received CSI reports and CoMP information, and suitable cooperative reception can be performed.

FIG. 16 is a sequence diagram of one example of processes for cooperative reception for uplink communication. The base station N4 uses the cell C41 and transmits a nearby cell estimation request to the mobile station U1 (step S1601). The nearby cell estimation request is a signal requesting estimation of the propagation loss for each nearby cell. The mobile station U1 transmits to the cell C41, an estimation request response in response to the nearby cell estimation request transmitted at step S1601 (step S1602). The estimation request response includes the propagation loss for each nearby cell.

The base station N4, based on the estimation results included in the estimation request response transmitted at step S1602, selects cooperative cell candidates. In this example, the cell C23 and the cell C42 are assumed to be selected as cooperative cell candidates. The base station N4 transmits a cooperative communication request to the base station N2 managing the cell C23 selected as a cooperative cell candidate (step S1603). The cell C42 is a cell managed by the base station N4 and therefore, the base station N4 need not transmit a cooperative communication request to the cell C42.

The base station N2 transmits to the base station N4, a cooperative communication request response that is in response to the cooperative communication request transmitted from the base station N4 at step S1603 and that indicates the potential of cooperative reception (step S1604). In this example, a cooperative communication request response indicating that the cooperative reception is possible is assumed to transmitted from the base station N2 to the base station N4. The base station N4 transmits CoMP information to the base station N4 (step S1605). The base station N2 transmits CoMP information to the base station N2 (step S1606).

The base station N4 receives data from the mobile station U1 by cooperative reception (JT) via the cell C41 and the cell C42 (step S1607). At step S1607, the mobile station U1 performs beam forming with respect to the signals to the cell C41 and the cell C42 such that interference at the cell C23 is reduced (CB). Further, at step S1607, based on the CSI report received at step S1604 and the CoMP information received at step S1606, cooperative reception parameters are set.

The base station N2 receives data from the mobile station U2 via the cell C23 (step S1608). At step S1608, the mobile station U2 performs beam forming with respect to the signal to the cell C23 such that interference at the cell C41 and the cell C42 is reduced (CB). Further, at step S1608, based on the CSI report received at step S1603 and the CoMP information received at step S1605, cooperative reception parameters are set.

FIG. 17 is a sequence diagram of one example of periodic exchange of control information for uplink communication. In FIG. 17, a case where the exchange of CoMP information performed periodically will be described. For example, after step S1608 depicted in FIG. 16, the base station N4 transmits CoMP information to the base station N2 (step S1701). The base station N2 transmits CoMP information to the base station N4 (step S1702).

The base station N4 receives data from the mobile station U1 by cooperative reception via the cell C41 and the cell C42 (step S1703). The base station N2 receives data from the mobile station U2 via the cell C23 (step S1704). The base station N4 receives data from the mobile station U1 by cooperative reception via the cell C41 and the cell C42 (step S1705). The base station N2 receives data from the mobile station U2 via the cell C23 (step S1706). The base station N4 receives data from the mobile station U1 by cooperative reception via the cell C41 and the cell C42 (step S1707). The base station N2 receives data from the mobile station U2 via the cell C23 (step S1708).

At steps S1703, S1705, and S1707, the mobile station U1 performs beam forming with respect to the signals to the cells C41, C42 such that interference at the cell C23 is reduced. At steps S1704, S1706, and S1708, the mobile station U2 performs beam forming with respect to the signal to the cell C23 such that interference at the cells C41, C42 is reduced.

Steps S1709 to S1714 are identical to steps S1701 to S1706 and description thereof is omitted. In this manner, periodic exchange of CoMP information while cooperative reception with respect to the mobile station U1 and the mobile station U2 is performed, enables suitable cooperative reception to be performed, even if wireless propagation characteristics change consequent to the movement of the mobile station U1 and/or the mobile station U2.

FIG. 18 is a sequence diagram of one example of periodic cooperative cell updating for uplink communication. Steps S1801 to S1804 depicted in FIG. 18 are identical to steps S1601 to S1604 depicted in FIG. 16. When a given period of time has elapsed after step S1804, the base station N4 uses the cell C41 and transmits a nearby cell estimation request to the mobile station U1 (step S1805). The mobile station U1 transmits to the cell C41, an estimation request response in response to the nearby cell estimation request transmitted at step S1805 (step S1806).

The base station N4, based on the estimation results included in the estimation request response transmitted at step S1806, selects cooperative cell candidates. In this example, the cell C31 and the cell C42 are assumed to be selected as cooperative cell candidates.

The base station N4 transmits notification of cooperative communication completion to the base station N2, which manages the cell C23 not selected as a cooperative cell candidate (step S1807). The base station N2 transmits to the base station N4, a completion notification response in response to the notification of cooperative communication completion transmitted at step S1807 (step S1808).

The base station N4 transmits a cooperative communication request to the cell C31 selected as a cooperative cell candidate (step S1809). The base station N3 transmits to the base station N4, a cooperative communication request response indicating the potential of the cooperative reception requested by the cooperative communication request transmitted at step S1809 (step S1810). In this example, a cooperative communication request response indicating that the cooperative reception is possible, is assumed to be transmitted from the base station N3 to the base station N4.

Thus, cooperative reception using the cell C23 and the cell C42 can be switched to cooperative reception using the cell C31 and the cell C42. In this manner, the propagation loss at the mobile station U1 is periodically estimated and the cooperative cells are updated, enabling suitable cooperative reception to be performed, even if wireless propagation characteristics change consequent to the movement of the mobile station U1.

The setting of weighting coefficients based on traveling speed of mobile station will be described. The base station N4, by setting the coefficient $w_i$ of expression 6 by, for example, equation 3, may set the coefficient $w_i$ based on the product of the delay $\tau_i$ and the estimated speed $v_j$.

FIG. 19 is a flowchart of a second example of uplink operations of the base station. Here, an example of operations of the base station N4 will be described for a case where the coefficient $w_i$ is set based on the product of the delay $\tau_i$ and the estimated speed $v_j$. Steps S1901, S1902 depicted in FIG. 19 are identical to steps S1501, S1502 depicted in FIG. 15. Subsequent to step S1902, the base station N4 estimates the traveling speed of the mobile station U1 (step S1903).

Steps S1904 to S1909 depicted in FIG. 19 are identical to steps S1503 to S1508 depicted in FIG. 15. However, at step S1904, the weighting coefficient $w_i$ is set based on the delay $\tau_i$ acquired at step S1901 and the estimated speed $v_j$ of the mobile station U1 estimated at step S1903 (step S1904).

Thus, the estimated speed $v_j$ of the mobile station U1 is estimated, and based on the delay $\tau_i$ and the estimated speed $v_j$, the weighting coefficient $w_i$ of the non-local cell i is set, thereby enabling a non-local cell i having a large reduction effect on interference to be preferentially selected as a cooperative cell.

The setting of weighting coefficients, based on the applicable cooperative communication scheme will be described. The base station N4, by setting the coefficient $w_i$ in expression 6 by, for example, equation 4, may set the coefficient $w_i$ based on the applicable cooperative communication scheme.

FIG. 20 is a flowchart of a third example of uplink operations of the base station. Here, an example of operation of the base station N4 will be described for a case where the coefficient $w_i$ is set based on the applicable cooperative communication scheme. The base station N4 acquires nearby cell information related to nearby cells of the mobile station U1 (step S2001). The nearby cell information includes information indicating the cooperative communication scheme applicable in the non-local cell i.

Steps S2002 to S2008 depicted in FIG. 20 are identical to steps S1502 to S1508 depicted in FIG. 15. However, at step S2003, the weighting coefficient $w_i$ of the non-local cell i is set based on the applicable cooperative communication scheme of non-local cell i, indicated in the nearby cell information acquired at step S2001.

Thus, the nearby cell information is acquired and based on the applicable cooperative communication scheme of the non-local cell i, the weighting coefficient $w_i$ of the non-local cell i is set, thereby enabling a non-local cell i having a large reduction effect on interference that is consequent to cooperative communication, to be selected as a cooperative cell.

In this manner, the base station according to the second embodiment enables a cell having a large reduction effect on interference to be preferentially selected as a cooperative cell for cooperative reception, by selecting the cooperative cell based on the reception power of each cell, weighted by the coefficient set for the cell. As a result, interference is reduced, enabling communication quality to be improved. Further, cells for which the reduction effect on interference is small are excluded from the cooperative cells, whereby the number of cooperative cells that communicate to perform the cooperative reception, the measurement processing at the mobile station, and the volume of feedback information from the mobile station to the base station can be decreased.

As described, according to the base station, the communication method, and the mobile station, a cell having a large reduction effect on interference is preferentially selected as a cooperative cell, thereby enabling communication quality to be improved.

According to the disclosed base station, communication method, and mobile station, communication quality can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station that requests cooperative transmission of a base station forming a nearby cell that is near a mobile station, the base station comprising:
   a setter that sets a coefficient of each nearby cell;
   an acquirer that acquires a reception power for each nearby cell of the mobile station; and
   a selector that based on each value for each acquired reception power weighted by the coefficient of the nearby cell and from among the nearby cells, selects a cell of which the cooperative transmission is to be requested, wherein
   the setter sets the coefficients based on intercellular communication delays of the nearby cells.

2. The base station according to claim 1 and further comprising
   a controller that performs the cooperative transmission using the cell selected by the selector.

3. The base station according to claim 1, further comprising:
   a calculator, wherein
   the acquirer acquires the reception power of a local cell of the mobile station and the reception power of each non-local cell that are among the nearby cells and different from the local cell, and
   the calculator calculates a ratio of the reception power of each non-local cell with respect to the reception power of the local cell, the ratio being weighted by the coefficient of the non-local cell.

4. The base station according to claim 1, wherein
the selector compares the each value with a threshold and based on a comparison result, selects the cell of which the cooperative transmission is to be requested.

5. The base station according to claim 3
the setter sets, for a non-local cell among the non-local cells and having, with respect to intercellular communication with the local cell, a delay that is smaller than a delay threshold, a coefficient that is larger than that set for a non-local cell having a delay larger than the delay threshold.

6. The base station according to claim 5 and further comprising
a delay acquirer that acquires the delay of each non-local cell, wherein
the setter sets the coefficients, based on the acquired delays.

7. The base station according to claim 5, wherein
the setter, for a non-local cell among the non-local cells and for which the product of traveling speed of the mobile station and the delay is smaller than a product threshold, sets a coefficient that is larger than that set for a non-local cell for which the product is larger than the product threshold.

8. The base station according to claim 7 and further comprising
an estimator that estimates the traveling speed of the mobile station, wherein
the setter sets the coefficients, based on the traveling speed estimated by the estimator.

9. The base station according to claim 3
the setter sets the coefficient of each nearby cell, based on an applicable cooperative communication scheme in the non-local cell.

10. The base station according to claim 9 and further comprising
a scheme acquirer that acquires the cooperative communication scheme from each non-local cell, wherein
the setter sets the coefficients, based on the cooperative communication schemes acquired by the scheme acquirer.

11. A base station that requests cooperative reception of a base station forming a nearby cell that is near a mobile station, the base station comprising:
a setter that sets a coefficient of each nearby cell;
an acquirer that acquires interference power that is from the mobile station to each nearby cell of the mobile station; and
a selector that based on each value for each acquired interference power weighted by a coefficient for the nearby cell and from among the nearby cells, selects a cell of which the cooperative reception is to be requested, wherein
the setter sets the coefficients based on intercellular communication delays of the nearby cells.

12. The base station according to claim 11, wherein
the acquirer acquires as the interference power, propagation loss from each nearby cell to the mobile station.

13. A communication method of requesting cooperative transmission of a base station forming a nearby cell that is near a mobile station, the communication method comprising:
setting a coefficient of each nearby cell;
acquiring a reception power for each nearby cell of the mobile station; and
selecting based on each value for each acquired reception power weighted by a coefficient of the nearby cell, a cell of which the cooperative transmission is to be requested, wherein
the coefficients are set based on intercellular communication delays of the nearby cells.

14. A communication method of requesting cooperative reception of a base station forming a nearby cell that is near a mobile station, the communication method comprising:
setting a coefficient of each nearby cell;
acquiring interference power that is from the mobile station to each nearby cell of the mobile station; and
selecting based on each value for each acquired interference power weighted by a coefficient for the nearby cell, a cell of which the cooperative reception is to be requested, wherein
the coefficients are set based on intercellular communication delays of the nearby cells.

15. A mobile station comprising:
a receiver that receives data cooperatively transmitted from a portion of or all cells selected from among cells nearby the mobile station, the cells being selected based on values that are for reception powers from the nearby cells and are weighted by cell-specific coefficients, wherein the coefficients are set based on intercellular communication delays of nearby cells.

16. A mobile station comprising:
a transmitter that transmits data to be cooperatively received by a portion of or all cells selected from among cells nearby the mobile station, the cells being selected based on values that are for interference power that is from the mobile station to each nearby cell and that are weighted by cell-specific coefficients, wherein the coefficients are set based on intercellular communication delays of nearby cells.

17. A base station that requests cooperative transmission of a base station forming a nearby cell that is near a mobile station, the base station comprising:
a setter that sets a coefficient of each nearby cell;
an acquirer that acquires a reception power for each nearby cell of the mobile station; and
a selector that based on each value for each acquired reception power weighted by the coefficient of the nearby cell and from among the nearby cells, selects a cell of which the cooperative transmission is to be requested, wherein
the setter sets the coefficient of each nearby cell, based on an applicable cooperative communication scheme in a non-local cell that is different from a local cell of the mobile station.

* * * * *